(12) United States Patent
Mildh et al.

(10) Patent No.: US 12,144,053 B2
(45) Date of Patent: Nov. 12, 2024

(54) BEARER MAPPING IN IAB NODES

(71) Applicant: TELEFONAKTIEBOLAGET LM ERICSSON (PUBL), Stockholm (SE)

(72) Inventors: Gunnar Mildh, Sollentuna (SE); Ajmal Muhammad, Sollentuna (SE); Oumer Teyeb, Montréal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 372 days.

(21) Appl. No.: 17/608,273

(22) PCT Filed: May 1, 2020

(86) PCT No.: PCT/IB2020/054150
§ 371 (c)(1),
(2) Date: Nov. 2, 2021

(87) PCT Pub. No.: WO2020/222196
PCT Pub. Date: Nov. 5, 2020

(65) Prior Publication Data
US 2022/0248495 A1  Aug. 4, 2022

Related U.S. Application Data

(60) Provisional application No. 62/842,382, filed on May 2, 2019.

(51) Int. Cl.
*H04W 76/27* (2018.01)
(52) U.S. Cl.
CPC .................................. *H04W 76/27* (2018.02)
(58) Field of Classification Search
CPC ...... H04W 76/27; H04W 76/22; H04W 76/11
See application file for complete search history.

(56) References Cited

U.S. PATENT DOCUMENTS 10,958,511 B2 *  3/2021  Majmundar .......... H04W 24/02
11,057,791 B2 *  7/2021  Majmundar ...... H04W 28/0284
(Continued)

FOREIGN PATENT DOCUMENTS

| CN | 102158977 A | 8/2011 |
| TW | 201909672 A | 3/2019 |
| WO | 2012089056 A1 | 7/2012 |

OTHER PUBLICATIONS

LG Electronics Inc., "Bearer mapping in IAB Node," 3GPP TSG-RAN2 Meeting AdHoc#1807, R2-1810529, Jul. 2018, Montreal, Canada, 4 pages. (Year: 2018).*
(Continued)

*Primary Examiner* — Ayaz R Sheikh
*Assistant Examiner* — Tarell A Hampton
(74) *Attorney, Agent, or Firm* — Ericsson Inc.

(57) ABSTRACT

According to some embodiments, a method performed by an integrated access and backhaul (IAB) network node comprises receiving a backhaul channel configuration from a network node. The backhaul channel configuration comprises a mapping of one or more traffic identifiers to one or more wireless backhaul channels. The method further comprises receiving incoming traffic for transmission on a wireless backhaul channel, determining the wireless backhaul channel for transmitting the incoming traffic based on a type of the incoming traffic and the mapping of one or more traffic identifiers to one or more wireless backhaul channels, and transmitting the received incoming traffic on the determined wireless backhaul channel.

18 Claims, 25 Drawing Sheets

(56) References Cited

U.S. PATENT DOCUMENTS

| | | | |
|---|---|---|---|
| 2016/0381620 A1 | 12/2016 | Panaitopol et al. | |
| 2018/0092139 A1 | 3/2018 | Novlan et al. | |
| 2020/0137614 A1* | 4/2020 | Hampel | H04W 76/11 |
| 2020/0413457 A1* | 12/2020 | Hong | H04W 76/10 |
| 2021/0014768 A1* | 1/2021 | Hong | H04W 40/22 |
| 2021/0099385 A1* | 4/2021 | Huang | H04B 7/15528 |
| 2021/0127319 A1* | 4/2021 | Huang | H04W 8/08 |
| 2021/0127380 A1* | 4/2021 | Liu | H04W 76/22 |
| 2021/0243672 A1* | 8/2021 | Deshmukh | H04W 28/0268 |
| 2021/0352700 A1* | 11/2021 | Lohr | H04W 28/0278 |
| 2021/0360466 A1* | 11/2021 | Jactat | H04W 76/12 |
| 2022/0046463 A1* | 2/2022 | Wu | H04W 28/0278 |
| 2022/0078661 A1* | 3/2022 | Wang | H04W 28/0263 |

OTHER PUBLICATIONS

"3rd Generation Partnership Project; Technical Specification Group Radio Access Network; Study on Integrated Access and Backhaul; (Release 15)", 3GPP Draft; TR 38874 V070, F-06921 Sophia-Antipolis Cedex ; France, Dec. 28, 2018 (Dec. 28, 2018). (Year: 2018).*

Samsung, "Discussion on Bearer mapping between UE DRB and IAB DRB", 3GPP TSG-RAN WG2 Meeting #102, May 21-25, 2018, R2-1807550, 5 pages. (Year: 2018).*

3rd Generation Partnership Project; Technical Specification Group Radio Access Network; Study on Integrated Access and Backhaul; (Release 15) 3GPP TR 38.874 V0.7.0, Nov. 2018.

Qualcomm Incorporated (Rapporteur), Email discussion [103bis##32][NR-IAB] Unified Design, R2-18xxxxx, 3GPP TSG-RAN WG2 Meeting #104, Spokane, WA, USA, Nov. 12-16, 2018.

Nokia, et al., Adaptation layer contents and configuration, R2-1900626, 3GPP TSG-RAN WG2 Meeting #105, Athens, Greece, Feb. 25-Mar. 1, 2019.

Ericsson (Rapporteur), Email discussion [105#47][NR_IAB-Core] Bearer Mapping, R2-1903964, 3GPP TSG-RAN WG2 Meeting #105bis, Xi'an, China, Apr. 8-12, 2019.

Qualcomm Incorporated (Rapporteur), RAN2/RAN3 offline IAB discussion, R2-1905374, 3GPP TSG-RAN WG2 Meeting #105bis, Xi'an, China, Apr. 8-12, 2019.

3rd Generation Partnership Project; Technical Specification Group Radio Access Network; NG-RAN; Architecture description (Release 16) 3GPP TS 38.401 V16.0.0, Dec. 2019.

Qualcomm, New WID: Integrated Access and Backhaul for NR, RP-182882 (Revision of RP-182810), 3GPP TSG RAN Meeting #82, Sorrento, Italy, Dec. 10-13, 2018.

Huawei, "Bearer Mapping in Donor-DU and IAB node", 3GPP TSG-RAN WG3 Meeting #103, R3-190500, Athens, Athens, Feb. 25-Mar. 1, 2018.

Huawei, "Bearer Mapping in IAB donor-DU and IAB node", 3GPP TSG-RAN WG3 Meeting #103bis, R3-191839, Xi'an, China, Apr. 8-Apr. 12, 2019.

Nokia, Nokia Shanghai Bell, "3GPP TSG-WG3 Meeting #103bis", R3-191389, Xi'an, China, Apr. 8-12, 2019.

Ericsson, Backhaul Channel Setup and Modification Procedure for IAB Networks, 3GPP TSG RAN WG2 Meeting #105bis, R2-1903970, Xi'an, P.R. of China, Apr. 8-12, 2019.

Ericsson: "Protocol Stack for IAB Architecture 1a and 1b". 3GPP TSG-RAN WG2 #101bis. R2-1804808. Sanya, P. R. China. Apr. 16-20, 2018.

Ericsson: "The need for 2 step UL BH RLC channel mapping in IAB nodes". 3GPP TSG-RAN WG2 Meeting #106. R2-1907009. Reno, NV, USA. May 13-17, 2019.

Qualcomm Incorporated (Rapporteur): "Email discussion [103bis#32][NR-IAB] Unified Design". 3GPP TSG-RAN WG2 Meeting #104. R2-18xxxxx. Spokane, WA, USA, Nov. 12-16, 2018.

ZTE Corporation, et al.: "Consideration on user plane bearer mapping". 3GPP TSG RAN WG2 Meeting #105bis. R2-1904599. Xi'an, China. Apr. 8-12, 2019.

* cited by examiner

BEARER MAPPING IN IAB NODES

This application is a 371 of International Application No. PCT/IB2020/054150, filed May 1, 2020, which claims the benefit of U.S. Application No. 62/842,382, filed May 2, 2019, the disclosures of which are fully incorporated herein by reference.

TECHNICAL FIELD

Particular embodiments relate to wireless communication, and more specifically to mapping bearer channels and backhaul channels in an integrated access and backhaul (IAB) network node.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) specifications include integrated access and wireless access backhaul (IAB) in fifth generation (5G) new radio (NR). The following is a general overview of the IAB protocol and architecture.

The use of short range mmWave spectrum in NR results in densified deployment with multi-hop backhauling. However, optical fiber to every base station is too costly and sometimes not even possible (e.g., historical sites). The main IAB principle is the use of wireless links for the backhaul (instead of fiber) to enable flexible and dense deployment of cells without densifying the transport network. Use case scenarios for IAB can include coverage extension, deployment of massive number of small cells, and fixed wireless access (FWA) (e.g., to residential/office buildings). The larger bandwidth available for NR in mmWave spectrum provides opportunity for self-backhauling without unduly limiting the spectrum available for the access links. On top of that, the inherent multi-beam and multiple input multiple output (MIMO) support in NR reduce cross-link interference between backhaul and access links facilitating higher densification.

Some solutions (e.g., TR 38.874) leverage the central unit (CU)/distributed unit (DU) split architecture of NR, where the IAB node hosts a DU part that is controlled by a central unit. The IAB nodes also have a mobile termination (MT) part for communication with their parent nodes.

The specifications for IAB may reuse existing functions and interfaces defined in NR. In particular, MT, gNB-DU, gNB-CU, user plane function (UPF), access and mobility management function (AMF) and session management function (SMF) as well as the corresponding interfaces NR Uu (between MT and gNB), F1, NG, X2 and N4 are used as baseline for the IAB architectures. Modifications or enhancements to these functions and interfaces for the support of IAB are explained in the context of the architecture discussion. Additional functionality such as multi-hop forwarding is included in the architecture discussion as it is necessary for the understanding of IAB operation and certain aspects may require standardization.

The mobile termination (MT) function is defined as a component of the IAB node. MT is referred to as a function residing on an IAB-node that terminates the radio interface layers of the backhaul Uu interface toward the IAB-donor or other IAB-nodes.

FIG. 1 is a reference diagram for IAB in standalone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP next generation radio access network (NG-RAN) architecture. IAB-related aspects may arise when such split is exercised. Also, some of the functions presently associated with the IAB-donor may eventually be moved outside of the donor in case it becomes evident that they do not perform IAB-specific tasks.

FIG. 2 illustrates the baseline user plane protocol stacks for IAB. As illustrated, the service data adaptation protocol (SDAP) is provided between the user equipment (UE) and the donor IAB via backhaul channels through IAB nodes 1 and 2.

FIGS. 3A-3C illustrate the baseline control plane protocol stacks for IAB. In FIG. 3A, the radio resource control (RRC) protocol is provided between the UE and the donor IAB CU-UP via backhaul channels through the IAB nodes. In FIG. 3B, the RRC protocol between an IAB node MT and the donor IAB CU-CP is provided over backhaul channels through and IAB node. In FIG. 3C, the F1-AP is provided from the IAB node DU to the IAB donor CU-UP via backhaul channels through the IAB nodes.

The chosen protocol stacks reuse the current CU-DU split specification, where the full user plane F1-U (GTP-U/UDP/IP) is terminated at the IAB node (like a normal DU) and the full control plane F1-C (F1-AP/SCTP/IP) is also terminated at the IAB node (like a normal DU). Network Domain Security (NDS) is employed to protect both UP and CP traffic (IPsec in the case of UP, and datagram transport layer security (DTLS) in the case of CP). IPsec could also be used for the CP protection instead of DTLS (in this case no DTLS layer is used).

A new protocol layer, referred to as backhaul adaptation protocol (BAP) (labelled "adapt" in FIGS. 3A-3C), in the IAB nodes and the IAB donor is used for routing of packets to the appropriate downstream/upstream node and also mapping the UE bearer data to the proper backhaul radio link control (RLC) channel (and also between ingress and egress backhaul RLC channels in intermediate IAB nodes) to satisfy the end to end quality of service (QoS) requirements of bearers.

Routing and bearer mapping (e.g., mapping of backhaul RLC channels) are adaptation layer functions. The transmit (TX) part of adaptation layer performs routing and "bearer mapping." The receive (RX) part of adaptation layer performs bearer demapping. Service data units (SDUs) are forwarded from RX part of adaptation layer to TX part of adaptation layer (for the next hop) for packets that are relayed by the IAB node.

The BAP entity may be included in both MT and DU parts of the IAB-node protocol stack. Modelling the BAP layer this way facilitates the realization of the routing and mapping functionalities of the adaptation layer.

Before describing the operations of the two BAP entities, the first thing to consider is whether the radio bearers carrying CP/UP traffic for the MT functionality of an IAB node should be handled separately from the backhaul RLC channels. The backhaul RLC channels are used to carry traffic to/from the IAB DU functionality, which could either be intended for the UEs served by the IAB node or for the child IAB nodes. The radio bearers and backhaul RLC channels may be handled separately by employing different logical channel IDs.

FIGS. 4 and 5 illustrate the flow of packets in the downlink direction. FIGS. 6 and 7 illustrate the flow of packets in the uplink direction.

FIG. 4 is a flow diagram illustrating an example of bearer mapping in IAB nodes for downstream transmission. FIG. 5 is a flow diagram illustrating an example of the functions performed by BAP entities for downstream transmission.

For downlink, when a packet arrives at the IAB donor DU (from the donor CU) and is processed first by the upper layers (as there is no MT BAP layer at the donor DU), if the packet is destined to UEs directly connected to the IAB donor DU or it is an F1-AP traffic destined at the IAB donor DU, it is forwarded to higher layers (IP/UDP/GTP-U for UP, IP/SCTP/F1-AP for CP). Otherwise (i.e., it is to be forwarded further downstream), it is forwarded to the DU BAP layer.

When a packet arrives at an IAB node (from a parent IAB node or IAB donor DU) via backhaul RLC channels is processed first by the MT BAP layer, then if the packet is destined to UEs directly connected to the IAB node or F1-AP traffic destined at the IAB node's DU, it is forwarded to higher layers (IP/UDP/GTP-U for UP, IP/SCTP/F1-AP for CP). Otherwise (i.e., it is to be forwarded further downstream), it is forwarded to the DU BAP layer.

In both scenarios above, when forwarding to the DU BAP layer, the DU BAP determines which route (i.e., to which child node) the packet is to be forwarded to and determines which backhaul RLC channel within the route will be used for forwarding the packet downstream.

FIG. 6 is a flow diagram illustrating an example of bearer mapping in IAB nodes for upstream transmission. FIG. 7 is a flow diagram illustrating an example of the functions performed by BAP entities for upstream transmission.

For uplink, when a packet arrives at the IAB donor DU (from a child IAB node) via backhaul RLC channels, it is processed first by the DU BAP layer and is forwarded to the donor CU (as the donor DU can be connected to at most one donor CU, there is no routing functionality required).

When a packet arrives at an IAB node in the uplink direction, if it is coming from a child IAB node via backhaul RLC channels it is processed first by the DU BAP layer and, because every uplink packet is destined to be forwarded to the donor CU, it is passed on to the MT BAP layer. If the packet is from a UE connected directly to the IAB node, or it is F1-AP traffic originating from the IAB node, it is processed first by the higher layers (IP/UDP/GTP-U for UP, IP/SCTP/F1-AP for CP) and is forwarded to the MT BAP layer.

In both forwarding examples above, the MT BAP determines which route (i.e. which parent node) the packet is to be forwarded to and determines which backhaul RLC channel within that route will be used for forwarding the packet upstream.

IAB networks support multi-connectivity. There can be more than one route towards an IAB node (i.e., an IAB node can have more than one parent node). The two proposed methods for IAB multi-connectivity are: (a) an IAB node having multiple MT entities, each entity connecting to a different parent node (or cell of a parent node); and (b) using the dual connectivity concept of NR, where the MT part of the IAB node connects to two different cell groups, one belonging to the master cell group (MCG) and another to the secondary cell group (SCG).

Currently in NR, dual connectivity is supported by setting up multiple UE bearer contexts in the DUs that serve the UE. These different UE contexts are identified in as part of F1-U (GTP tunnels) to the DU serving the UE. An example is illustrated in FIG. 8.

FIG. 8 is functional diagram illustrating NR dual connectivity to UEs. The dual connectivity aspects are transparent to UE application layers. The UE send/receive data from a data radio bearer (DRB) which could be configured as a MCG, SCG or split DRB. For a split DRB, the splitting point is below the packet data convergence protocol (PDCP) and relies on various NR PDCP functions to handle re-ordering, re-transmission and duplication removal.

The NR-DC framework may be reused for setting up multi-connectivity to IAB nodes. Using NR-DC for IAB node requires some changes to the user plane. Reasons for the changes are that the IAB nodes do not terminate PDCP for F1-U traffic. Similarly, the parent nodes to the IAB do not terminate F1-U for other IAB nodes (the forwarding is instead handled by adaptation layer). The architecture based on full F1-U support to the IAB node does not assume that there is any CU-UP function for traffic going to the IAB node (instead the DU handles IP routing). Similarly, the IP address for NR DC terminates in the UPF, which is not in line with the architecture.

A simplified version of NR DC may be adopted to support multi-path that is still in line with existing architecture assumptions and avoids additional complexities such as tunneling in tunneling, assuming the following: (a) no split bearers are supported, which avoids introduction of CU-UP functionality and re-ordering functionality etc.; (b) each path should be associated with a separate BAP routing identifier, which avoids GTP tunnels to the parent nodes (carrying GTP tunnels to IAB node); and (c) each path should be associated with its own IP address making the paths visible on the F1 application layer, making it possible to setup paths through different donor DUs.

With these assumptions it is possible to support redundancy and rudimentary load balancing on the F1 application layer using things like multipath stream control transmission protocol (SCTP) and smart load balancing of UE GTP tunnels to different paths. Later releases may include more advanced load balancing mechanisms for IAB nodes.

The user plane may support a simplified version of NR DC for IAB nodes where each path is seen as a separate IP connection which can be used by the application layer (F1-C/F1-U) for redundancy and rudimentary load balancing. This is described in 3GPP 38.874 section 9.7.9.

Using NR-DC to support multi-connectivity for IAB nodes includes the following assumptions: (a) Only MCG, or SCG backhaul bearers are supported, split backhaul bearers are not supported; (b) each separate connection to a given IAB node is associated with a separate BAP identifier (e.g., address, path, address+path); and (c) each separate connection is associated with at least one separate IP address to support multiple connections to use a different donor DU, and allow selection of which connection to use by the end nodes (IAB node, CU).

FIGS. 9-11 illustrate an example dual connectivity scenario. FIG. 9 illustrates the starting scenario.

FIG. 9 is a connectivity diagram illustrating single connectivity before DC is setup. IAB node 1 is connected via IAB node 2 and Donor DU 1 towards the transport network layer (TNL). The Donor DU 1 route any packets destined to the IP address 1 of the IAB node 1 over the wireless backhaul to IAB node 2. The routing is based on a BAP identifier 1 associated with IP address 1.

The Donor CU determines (e.g., based on IAB node 1 RRC level measurements, IAB node capabilities, etc.) that IAB node 1 should establish dual connectivity to IAB node 3. Existing NR DC RRC procedure is used to establish an SCG connection to IAB node 3.

As part of the message, the donor CU configures the BAP identifier for the SCG link to IAB node 3. The donor CU also configures 1 or more backhaul RLC channels between IAB node 1 and IAB node 3 as well as a new BAP route for the new connection. After the new path is setup on the BAP, IAB node 1 can be allocated a new IP address 2 for the new connection. The end result is illustrated shown in FIG. 10.

FIG. 10 is a connectivity diagram illustrating multiple connectivity after DC setup. IAB node 1 is connected via 2 paths, where each path has a separate IP address and can be used for F1-C/U application layer redundancy.

The donor CU responsible for setting up DC to the IAB node configures separate BAP identifiers for each connection, enabling allocation of separate IP addresses for each connection.

When a child IAB node is connected to a parent IAB node which has support for multiple connections (e.g., as illustrated in FIG. 11 for IAB node 0), it is possible for the child IAB node to also use the multiple connections. For this reason, it is possible to assign the child IAB node multiple BAP identifiers. When the IAB node receives multiple BAP identifiers, it can request separate IP address for each BAP identifier.

FIG. 11 is a connectivity diagram illustrating multiple connectivity at intermediate nodes, leading to multiple connectivity of end nodes. An IAB child node connected to one or more upstream IAB node which uses NR-DC can be allocated multiple BAP identifiers and IP addresses for it to be able to use the multi-connectivity.

The setup and configuration (i.e., integration) for the IAB node is the first step in the operation of the IAB node. The integration procedure includes the following steps.

The first step is MT setup. During MT setup, the MT selects parent node and authenticates with AMF (Uu procedures). The AMF authorizes MT at gNB and the gNB establishes SRBs with MT (Uu procedures). The gNB may establish DRBs and PDU session with MT. The PDU session may be used for OAM connectivity The second step is backhaul setup. Backhaul setup includes establishment of a backhaul RLC channel between the IAB-node MT and the parent node. Configuration is done by CU-CP (e.g., using RRC). For this, MT's CU-CP needs to know that the MT belongs to an IAB node and not a UE, which it may derive, e.g., from MT authorization. The backhaul RLC channel is marked with the corresponding priority/QoS-class on the IAB-node MT and the parent node.

Backhaul establishment also includes establishment of adapt route(s) between the IAB-node MT and the IAB-donor DU. This includes configuration of adapt routing identifier(s) on the IAB-node MT and the IAB-donor DU, and configuration of routing entries on all IAB-node's ancestor nodes for new routing identifier.

Backhaul establishment also includes IP address allocation to the IAB-node for adapt interface, which is routable from wireline fronthaul via adapt route. The IP address must be specific to the-donor DU so that the CU can send IP packets to the IAB-node via the specific IAB-donor DU and the new adapt route. The IAB-donor DU has to support a pool of IP addresses that are routable from wireline fronthaul for all descendant IAB-nodes.

If IP assignment is done by the CU, the CU must know the IAB-donor-DU's available IP address pool for IAB nodes. If IP assignment is done via DHCPv4/6 with DHCP proxy on the IAB-donor-DU, a transport mechanism of ARP/NDP on top of the adapt layer may be defined. IP address allocation may include additional options.

The third step is DU setup. During DU setup, the DU establishes F1-C and cell activation using IP on adapt layer (procedure defined in TS 38.401 clause 8.5: F1 startup and cells activation). This includes OAM support for IAB-node DU via backhaul IP layer.

The recommended architecture option (Option 1a in TR 38.874) can manage IP address assignment internally in the RAN without core network involvement. In that respect, the above baseline allows for DHCP-based IP address assignment and setting up the OAM after IP address assignment without the MT establishing a PDU session. The three parts of the overall IAB node integration procedure is discussed below.

During MT functionality setup, the IAB node first connects via its MT functionality using the RRC setup procedure. After RRC connection setup, the MT functionality of the IAB node may perform NAS-level registration and authentication, but no PDU session establishment is required, as illustrated in FIG. 12.

After the NAS registration, a UE context for the IAB node can be created in the RAN (without any PDU session resources). In this way, there is no need to support any SMF/UPF functionality for the IAB nodes. NAS Rel-15 already separates the NAS registration from the PDU session establishment, making it possible to only perform registration without setting up PDU sessions, as well as setting up a UE context in the RAN without PDU session resources.

For backhaul setup, after the UE context for the IAB node is setup in the RAN, the RAN establishes one or more backhaul bearers that can be used for IP address assignment to the IAB node. For the situations where the IAB node is not directly communicating with the IAB donor node, but via other (already attached/connected) IAB nodes, the forwarding information in all intermediate IAB nodes is updated due to the setup of the new IAB node.

For DU functionality setup, after establishing connectivity to the operator's internal network, the DU functionality of the IAB node and its cells/sectors needs to be configured by the OAM before the DU can send an F1 Setup Request message to its corresponding CU, i.e. IAB-CU. The recommended architecture option for IAB supports the full IP connectivity to the IAB node, making it possible that the DU functionality can have direct IP connectivity to the OAM, instead of relying on the MT functionality to establish a special PDU session in the core network for OAM.

After configuring the DU functionality of the IAB node, the IAB node becomes operational as a DU and UEs will not be able to distinguish it from other gNBs. The IAB node can start serving UEs like any other DU/gNB.

The procedure for initial IAB node access can be based on the UE Initial Access signaling flow with slight modifications to fulfil the IAB node requirements. Meanwhile, for activation of IAB node DU cells, the F1 Startup and cells activation procedure defined in TS 38.401 can be reused as is. Taking the above into account, a process for integrating the IAB node into the NG-RAN is described below and illustrated in FIG. 12.

FIG. 12 is a sequence diagram illustrating an IAB node integration procedure. The IAB Initial Access and MT functionality setup includes the following steps.

1. The IAB node sends an RRCSetupRequest message to the gNB-DU.
2. The gNB-DU includes the RRC message and, if the IAB node is admitted, the corresponding lower layer configuration for the NR Uu interface in the INITIAL UL RRC TRANSFER message and transfers to the gNB-CU. The INITIAL UL RRC TRANSFER message includes the C-RNTI allocated by the gNB-DU.
3. The gNB-CU allocates a gNB-CU UE F1AP ID for the IAB node and generates RRCSetup message towards the IAB node. The RRC message is encapsulated in the DL RRC MESSAGE TRANSFER message.
4. The gNB-DU sends the RRCSetup message to the IAB node.
5. The IAB node sends the RRC CONNECTION SETUP COMPLETE message to the gNB-DU. The S-NSSAI IE in the RRC CONNECTION SETUP COMPLETE message indicates the IAB node.
6. The gNB-DU encapsulates the RRC message in the uplink RRC MESSAGE TRANSFER message and sends it to the gNB-CU.
7. The gNB-CU sends the INITIAL UE MESSAGE to the AMF. This could be a dedicated AMF serving only the IAB nodes.

At this point the IAB node will perform registration (including authentication and key generation) without establishing a PDU session.

8. The AMF sends the INITIAL CONTEXT SETUP REQUEST message to the gNB-CU.
9. The gNB-CU sends the IAB CONTEXT SETUP REQUEST message to establish the IAB node context in the gNB-DU. The message may also encapsulate the SecurityModeCommand message.
10. The gNB-DU sends the SecurityModeCommand message to the IAB node.
11. The gNB-DU sends the IAB CONTEXT SETUP RESPONSE message to the gNB-CU.
12. The IAB node responds with the SecurityModeComplete message.
13. The gNB-DU encapsulates the RRC message in the UL RRC MESSAGE TRANSFER message and sends it to the gNB-CU.
14. The gNB-CU generates the RRCReconfiguration message and encapsulates it in the downlink RRC MESSAGE TRANSFER message. The RRCReconfiguration may include a configuration of one or more IAB backhaul bearers.
15. The gNB-DU sends RRCReconfiguration message to the IAB node.
16. The IAB node sends RRCReconfigurationComplete message to the gNB-DU.
17. The gNB-DU encapsulates the RRC message in the uplink RRC MESSAGE TRANSFER message and sends it to the gNB-CU.
18. The gNB-CU sends the INITIAL CONTEXT SETUP RESPONSE message to the AMF.

At this point, the IAB node has established one or more backhaul bearers that can be used for creating TNL connectivity toward the gNB-CU and obtaining a TNL address (e.g., IP address and port assignments). Next, the IAB node can use the F1 Startup and Cells Activation procedures described in TS 38.401 to activate its cells and become operational.

After activating its cells, the IAB node is operational and can serve the UEs. The UEs can connect to the IAB node via the UE Initial Access procedure described in TS 38.401.

IAB networks also use bearer mapping. An IAB-node needs to multiplex the UE DRBs to the backhaul RLC channel. The following two options can be considered on bearer mapping in IAB-node.

Option 1 is a one-to-one mapping between UE DRB and backhaul RLC channel. An example is illustrated in FIG. 13.

FIG. 13 is a mapping diagram illustrating an example of one-to-one mapping between UE DRB and backhaul RLC channel In this option, each UE DRB is mapped onto a separate backhaul RLC channel. Further, each backhaul RLC channel is mapped onto a separate backhaul RLC channel on the next hop. The number of established backhaul RLC-channels is equal to the number of established UE DRBs.

Identifiers (e.g., for the UE and/or DRB) may be required (e.g., if multiple backhaul RLC channels are multiplexed into a single backhaul logical channel). Which exact identifiers are needed, and which of the identifier(s) are placed within the adaptation layer header depends on the architecture/protocol.

Option 2 is many-to-one mapping between UE DRBs and backhaul RLC channel. An example is illustrated in FIG. 14.

FIG. 14 is a mapping diagram illustrating an example of many-to-one mapping between UE DRBs and backhaul RLC channel. For the many-to-one mapping, several UE DRBs are multiplexed onto a single backhaul RLC channel based on specific parameters such as bearer QoS profile. Other information such as hop-count could also be configured. The IAB-node can multiplex UE DRBs into a single backhaul RLC channel even if the DRBs belong to different UEs. Furthermore, a packet from one backhaul RLC channel may be mapped onto a different backhaul RLC channel on the next hop. All traffic mapped to a single backhaul RLC channel receives the same QoS treatment on the air interface.

Because the backhaul RLC channel multiplexes data from/to multiple bearers, and possibly even different UEs, each data block transmitted in the backhaul RLC channel needs to contain an identifier of the UE, DRB, and/or IAB-node it is associated with. Which exact identifiers are needed, and which of the identifier(s) are placed within the adaptation layer header depends on the architecture/protocol. Some IAB networks may support both N:1 and 1:1 mapping.

A radio bearer is a concept used both in LTE and NR. The radio bearers provide transfer of data packets or signaling messages over the radio interface. Each radio bearer is typically associated with an instances of the PDCP and RLC protocols on both the UE and network side.

In legacy LTE, the UE is configured with RRC configuration that included the information of both lower and higher layer aspects in one common information element (IE) (radioResourceConfigDedicated). In NR (and also LTE rel-15, where LTE can be used in dual connectivity mode with a non-standalone NR cell), the structure has been modified so that the lower and higher layer configurations are split in different IEs.

The upper layer aspects (PDCP and SDAP) are configured using the radioBearerConfig IE, while the lower layer configurations are done via the cellGroupConfig IE that are part of the RRCReconfiguration message.

The structure of the different messages/IEs is shown below.

```
RRCReconfiguration ::=                              SEQUENCE {
    rrc-TransactionIdentifier                       RRC-TransactionIdentifier,
    criticalExtensions                              CHOICE {
        rrcReconfiguration
RRCReconfiguration-IEs,
        criticalExtensionsFuture                    SEQUENCE { }
    }
}
RRCReconfiguration-IEs ::=                          SEQUENCE {
    radioBearerConfig                               RadioBearerConfig   OPTIONAL,
-- Need M
    secondaryCellGroup                              OCTET STRING (CONTAINING
CellGroupConfig) OPTIONAL, -- Need M
    measConfig                                      MeasConfig
OPTIONAL, -- Need M
    lateNonCriticalExtension                        OCTET STRING
OPTIONAL,
    nonCriticalExtension
RRCReconfiguration-v1530-IEs OPTIONAL
}
RRCReconfiguration-v1530-IEs ::=                    SEQUENCE {
    masterCellGroup                                 OCTET STRING (CONTAINING
CellGroupConfig)   OPTIONAL, -- Need M
    fullConfig                                      ENUMERATED {true}
OPTIONAL, -- Cond FullConfig
    dedicatedNAS-MessageList                        SEQUENCE ( SIZE (1..maxDRB) ) OF
DedicatedNAS-Message                                OPTIONAL, -- Cond
nonHO
    masterKeyUpdate                                 MasterKeyUpdate   OPTIONAL, --
Cond MasterKeyChange
    dedicatedSIB1-Delivery                          OCTET STRING
(CONTAINING SIB1) OPTIONAL, -- Need N
    dedicatedSystemInformationDelivery              OCTET STRING
(CONTAINING SystemInformation)
OPTIONAL, -- Need N
    otherConfig                                     OtherConfig
OPTIONAL, -- Need M
    nonCriticalExtension
RRCReconfiguration-v1540-IEs OPTIONAL
}
RRCReconfiguration-v1540-IEs ::=                    SEQUENCE {
    otherConfig-v1540                               OtherConfig-v1540
OPTIONAL, -- Need M
    nonCriticalExtension
RRCReconfiguration-v15xy-IES                        OPTIONAL
}
RRCReconfiguration-v15xy-IEs ::=                    SEQUENCE {
    mrdc-SecondaryCellGroupConfig                   SetupRelease { MRDC-
SecondaryCellGroupConfig }   OPTIONAL, -- Need M
    radioBearerConfig2                              OCTET STRING (CONTAINING
RadioBearerConfig)   OPTIONAL,  -- Need M
    sk-Counter                                      SK-Counter
OPTIONAL,  -- Need N
    nonCriticalExtension                            SEQUENCE { }
OPTIONAL
}
MRDC-SecondaryCellGroupConfig ::=                   SEQUENCE {
    mrdc-ReleaseAndAdd-r15                          ENUMERATED {true}
OPTIONAL,  -- Need N
    mrdc-SecondaryCellGroup                         CHOICE {
        nr-SCG                                          OCTET
STRING,
        eutra-SCG                                       OCTET
STRING
    } OPTIONAL   -- Need M
}
```

```
MasterKeyUpdate ::=                         SEQUENCE {
   keySetChangeIndicator                      BOOLEAN,
   nextHopChainingCount                       NextHopChainingCount,
   nas-Container                              OCTET STRING
 OPTIONAL,    -- Cond securityNASC
   ...
}
RadioBearerConfig ::=                       SEQUENCE {
   srb-ToAddModList                           SRB-ToAddModList
OPTIONAL,    -- Cond HO-Conn
   srb3-ToRelease                             ENUMERATED{true}
OPTIONAL,    -- Need N
   drb-ToAddModList                           DRB-ToAddModList
OPTIONAL,    -- Cond HO-toNR
   drb-ToReleaseList                          DRB-ToReleaseList
OPTIONAL,    -- Need N
   securityConfig                             SecurityConfig
OPTIONAL,    -- Need M
   ...
}
SRB-ToAddModList ::=                        SEQUENCE (SIZE (1..2))
OF SRB-ToAddMod
SRB-ToAddMod ::=                            SEQUENCE {
   srb-Identity                               SRB-Identity,
   reestablishPDCP                            ENUMERATED{true}
OPTIONAL,    -- Need N
   discardOnPDCP                              ENUMERATED{true}
OPTIONAL,    -- Need N
   pdcp-Config                                PDCP-Config
OPTIONAL,    -- Cond PDCP
   ...
}
DRB-ToAddModList ::=                        SEQUENCE (SIZE
(1..maxDRB)) OF DRB-ToAddMod
DRB-ToAddMod ::=                            SEQUENCE {
   cnAssociation                              CHOICE {
      eps-BearerIdentity                         INTEGER
(0..15),  -- EPS-DRB-Setup
      sdap-Config                                SDAP-Config
-- 5GC
   }  OPTIONAL,   -- Cond DRBSetup              DRB-Identity,
   drb-Identity
   reestablishPDCP                            ENUMERATED{true}
OPTIONAL,    -- Need N
   recoverPDCP                                ENUMERATED{true}
OPTIONAL,    -- Need N
   pdcp-Config                                PDCP-Config
OPTIONAL,    -- Cond PDCP
   ...
}
DRB-ToReleaseList ::=                       SEQUENCE (SIZE
(1..maxDRB)) OF DRB-Identity
SecurityConfig ::=                          SEQUENCE {
   securityAlgorithmConfig
SecurityAlgorithmConfig OPTIONAL,    -- Cond RBTermChange
   keyToUse                                   ENUMERATED{master,
secondary}                                  OPTIONAL,    -- Cond RBTermChange
   ...
}
CellGroupConfig ::=                         SEQUENCE {
   cellGroupId                                CellGroupId,
   rlc-BearerToAddModList                     SEQUENCE
( SIZE(1..maxLC-ID) ) OF RLC-BearerConfig      OPTIONAL,
-- Need N
   rlc-BearerToReleaseList                    SEQUENCE
(SIZE(1..maxLC-ID)) OF LogicalChannelIdentity    OPTIONAL,
-- Need N
   mac-CellGroupConfig                        MAC-
CellGroupConfig   OPTIONAL,    -- Need M
   physicalCellGroupConfig
PhysicalCellGroupConfig OPTIONAL,    -- Need M
   spCellConfig                               SpCellConfig
```

```
OPTIONAL,  -- Need M
    sCellToAddModList                                       SEQUENCE (SIZE
(1..maxNrofSCells) ) OF SCellConfig                         OPTIONAL,  --
Need N
    sCellToReleaseList                                      SEQUENCE (SIZE
(1..maxNrofSCells)) OF SCellIndex                           OPTIONAL,  --
Need N
    ...,
    [[
    reportUplinkTxDirectCurrent-v1530                       ENUMERATED
{true}                                                      OPTIONAL  -
- Cond BWP-Reconfig
    ]]
}
-- Serving cell specific MAC and PHY parameters for a SpCell:
SpCellConfig ::=                                            SEQUENCE {
    servCellIndex                                           ServCellIndex
OPTIONAL,  -- Cond SCG
    reconfigurationWithSync
ReconfigurationWithSync OPTIONAL,  -- Cond ReconfWithSync
    rlf-TimersAndConstants                                  SetupRelease { RLF-
TimersAndConstants }                                              OPTIONAL,
- Need M
    rlmInSyncOutOfSyncThreshold                             ENUMERATED {n1}
OPTIONAL,  -- Need S
    spCellConfigDedicated                                   ServingCellConfig
OPTIONAL,  -- Need M
    ...
}
ReconfigurationWithSync ::=                                 SEQUENCE {
    spCellConfigCommon
ServingCellConfigCommon OPTIONAL,  -- Need M
    newUE-Identity                                          RNTI-Value,
    t304                                                    ENUMERATED {ms50,
ms100, ms150, ms200, ms500, ms1000, ms2000, ms10000},
    rach-ConfigDedicated                                    CHOICE {
        uplink                                                  RACH-
ConfigDedicated,
        supplementaryUplink                                     RACH-
ConfigDedicated
    } OPTIONAL,  -- Need N
    ...,
    [[
    smtc                                                    SSB-MTC
OPTIONAL  -- Need S
    ]]
}
SCellConfig ::=                                             SEQUENCE {
    sCellIndex                                              SCellIndex,
    sCellConfigCommon
ServingCellConfigCommon OPTIONAL, -- Cond SCellAdd
    sCellConfigDedicated                                    ServingCellConfig
OPTIONAL,  -- Cond SCellAddMod
    ...,
    [[
    smtc                                                    SSB-MTC
OPTIONAL -- Need S
    ]]
}
RLC-BearerConfig ::=                                        SEQUENCE {
    logicalChannelIdentity
LogicalChannelIdentity,
    servedRadioBearer                                       CHOICE {
        srb-Identity                                            SRB-
Identity,
        drb-Identity                                            DRB-
Identity
    }  OPTIONAL,  -- Cond LCH-SetupOnly
    reestablishRLC                                          ENUMERATED
{true} OPTIONAL,  -- Need N
    rlc-Config                                              RLC-Config
OPTIONAL  -- Cond LCH-Setup
    mac-LogicalChannelConfig                                LogicalChannelConfig
OPTIONAL,  -- Cond LCH-Setup
    ...
}
```

-continued

```
PDCP-Config ::=                             SEQUENCE {
    drb                                         SEQUENCE {
        discardTimer                                ENUMERATED {ms10, ms20, ms30,
ms40, ms50, ms60, ms75, ms100, ms150, ms200,
                                                            ms250, ms300,
ms500, ms750, ms1500, infinity}                             OPTIONAL, -- Cond
Setup
        pdcp-SN-SizeUL                              ENUMERATED {len12bits,
len18bits}                                                  OPTIONAL, -- Cond
Setup2
        pdcp-SN-SizeDL                              ENUMERATED {len12bits,
len18bits}                                                  OPTIONAL, -- Cond
Setup2
        headerCompression                           CHOICE {
            notUsed                                     NULL,
            rohc                                        SEQUENCE {
                maxCID                                      INTEGER (1..16383)
DEFAULT 15,
                profiles                                    SEQUENCE {
                    profile0x0001                               BOOLEAN,
                    profile0x0002                               BOOLEAN,
                    profile0x0003                               BOOLEAN,
                    profile0x0004                               BOOLEAN,
                    profile0x0006                               BOOLEAN,
                    profile0x0101                               BOOLEAN,
                    profile0x0102                               BOOLEAN,
                    profile0x0103                               BOOLEAN,
                    profile0x0104                               BOOLEAN
                },
                drb-ContinueROHC                            ENUMERATED
{ true }                                                    OPTIONAL  --
Need N
            },
            uplinkOnlyROHC                              SEQUENCE {
                maxCID                                      INTEGER (1..16383)
DEFAULT 15,
                profiles                                    SEQUENCE {
                    profile0x0006                               BOOLEAN
                },
                drb-ContinueROHC                            ENUMERATED
{ true }                                                    OPTIONAL  --
Need N
            },
            ...
        },
        integrityProtection                         ENUMERATED { enabled }
OPTIONAL,   -- Cond ConnectedTo5GC
        statusReportRequired                        ENUMERATED { true }
OPTIONAL,   -- Cond Rlc-AM
        outOfOrderDelivery                          ENUMERATED { true }
OPTIONAL   -- Need R
    }
OPTIONAL,  -- Cond DRB
    moreThanOneRLC                              SEQUENCE {
        primaryPath                                 SEQUENCE {
            cellGroup                                   CellGroupId
OPTIONAL,  -- Need R
            logicalChannel                              LogicalChannelIdentity
OPTIONAL   -- Need R
        },
        ul-DataSplitThreshold                       UL-DataSplitThreshold
OPTIONAL, -- Cond SplitBearer
        pdcp-Duplication                            BOOLEAN
OPTIONAL   -- Need R
    }
```

```
                                        OPTIONAL, -- Cond MoreThanOneRLC
    t-Reordering                                        ENUMERATED {
                                                           ms0, ms1, ms2, ms4, ms5,
ms8, ms10, ms15, ms20, ms30, ms40,
                                                           ms50, ms60, ms80, ms100,
ms120, ms140, ms160, ms180, ms200, ms220,
                                                           ms240, ms260, ms280,
ms300, ms500, ms750, ms1000, ms1250,
                                                           ms1500, ms1750, ms2000,
ms2250, ms2500, ms2750,
                                                           ms3000, spare28, spare27,
spare26, spare25, spare24,
                                                           spare23, spare22, spare21,
spare20,
                                                           spare19, spare18, spare17,
spare16, spare15, spare14,
                                                           spare13, spare12, spare11,
spare10, spare09,
                                                           spare08, spare07, spare06,
spare05, spare04, spare03,
                                                           spare02, spare01 }
OPTIONAL, -- Need S
    ...,
    [[
    cipheringDisabled                                   ENUMERATED {true}
OPTIONAL -- Cond ConnectedTo5GC
    ]]
}
UL-DataSplitThreshold ::= ENUMERATED {
                                                           b0, b100, b200,
b400, b800, b1600, b3200, b6400, b12800, b25600, b51200,
b102400, b204800,
                                                           b409600, b819200,
b1228800, b1638400, b2457600, b3276800, b4096000, b4915200,
b5734400,
                                                           b6553600,
infinity, spare8, spare7, spare6, spare5, spare4, spare3,
spare2, spare1}
DRB-Identity ::=                                        INTEGER (1..32)
LogicalChannelIdentity ::=                              INTEGER (1..maxLC-ID)
maxLC-ID                                                INTEGER ::= 32
```

If a UE is operating in standalone mode, it will usually have only one radio bearer configuration in the radioBearerConfig IE that contains the higher layer configurations of that bearer. If the UE is operating in dual connectivity (DC) mode or is being prepared for DC (as it is possible to have a secondary node terminated bearer without any radio resource being allocated towards the secondary node, which is known as Secondary node terminated MCG bearer), then radioBearerConfig2 IE contains the bearers that are associated with the secondary node.

The radioBearerConfig IEs contain the security setting of the bearers (e.g., encryption/integrity protection algorithms) and the configuration of the SDAP and PDCP layers.

The UE can be configured with one or more cell group configurations (cellGroupConfig) (in rel-15, this is limited to a maximum of two). In the cell group configuration, a lot of information is provided regarding the cells that are associated with the cell group.

If the UE is operating in single connectivity, then it will have only one cell group configuration that contains configuration of the primary cell (PCell) and the secondary cells (SCells), if any, that are operating in carrier aggregation (CA) mode. This cell group is known as the master cell group (MCG) configuration. If the UE is operating in DC, then it will have an additional cell group configuration called secondary cell group (SCG) configuration that contains the configuration of the primary secondary cell (PSCell) and Secondary cells (SCells), if any, if the UE is operating in CA mode in the SCG as well.

Apart from the MCG/SCG Cells (PCell, PSCell, SCells) configurations, the cell group configurations also contain an RLC bearer configuration (RLC-BearerConfig) that is used to define the lower layer configurations for a given bearer (i.e., RLC/MAC). In the RLC bearer configuration, the servedRadioBearer IE associates the RLC bearer configuration with a particular bearer (be it a data radio bearer (DRB) or a signaling radio bearer (SRB)).

A bearer can be associated with more than one RLC bearer configuration (if a bearer is a split bearer that uses the MCG and SCG, or it is a bearer belonging to the MCG or SCG only but uses duplication via carrier aggregation, known as CA duplication). In this case, the PDCP configuration (pdcpConfig) contains the moreThanOneRLC IE that links the PDCP with the two RLC bearers.

As can be seen in the signaling, the radio bearer can be identified by a DRB ID, or SRB ID and a logical channel. The DRB/SRB IDs are used for different purposes such as input to PDCP encryption and/or integrity protection. The logical channel is used for MAC multiplexing.

There currently exist certain challenges. For example, as described above, an IAB network may establish backhaul RLC channels (or backhaul bearers) between an IAB node and its parent node (i.e., another IAB node or a donor DU) for supporting wireless backhauling traffic associated with UEs connected to the IAB node and UEs connected to other (child) IAB nodes connected to the IAB node. The backhaul RLC channel may be managed by the donor CU and setup towards the IAB node using RRC signaling, similar to how DRBs/RLC-bearers are managed towards the UEs.

The backhaul RLC channels carry end user traffic which is transported inside GTP-U/UDP/IP tunnels, as well as F1-AP signaling transported in SCTP/IP. In addition, it is possible to backhaul any IP service over the backhaul RLC channels, such as Operation and Maintenance (OAM) interfaces and IP traffic associated with other equipment at the same site as the IAB node including LTE base stations, Wi-Fi base station, CCTV cameras, weather stations, etc.

To ensure proper QoS treatment (e.g., prioritization) of the different types of traffic, it is beneficial if the operator can control the mapping of the traffic to the backhaul RLC channels. For IAB nodes this includes control of the uplink mapping of different types of traffic to backhaul RLC channels on the wireless backhaul interface. In the downlink, this function is handled by the donor gNB or donor gNB-DU.

A problem is that the management of the backhaul RLC channels may be done by another node (CU) and is also expected to be dynamic based on varying traffic needs. A simple approach could be to configure a "static" mapping in the IAB node (e.g., via OAM) during initial integration procedure of the IAB node, etc. An example is shown below:

Non-UE-associated F1 signaling=>BH RLC channel 1
UE-associated F1 signaling=>BH RLC channel 2
GTP-U data (with 5Q1=1)=>BH RLC channel 3
GTP-U data (with 5Q1=2)=>BH RLC channel 4
LTE user data (with QCI=1)=>BH RLC channel 3
OAM signaling=>BH RLC channel 5

However, there are some problems with such a static approach. The IAB node does not know the QoS treatment of each backhaul RLC channel. For example, if one backhaul RLC channel is not setup, the IAB node would not know how to map the traffic that was previously associated with that backhaul RLC channel. The number of backhaul RLC channels could change dynamically (e.g., if 1:1 mapping is to be performed, or if the number of backhaul RLC channels for N:1 mapping needs to be changed), meaning that there is a need to change the mapping, however it is not clear how the IAB node can do this.

SUMMARY

As described above, certain challenges currently exist with mapping traffic to integrated access and backhaul (IAB) backhaul channels. Certain aspects of the present disclosure and their embodiments may provide solutions to these or other challenges. For example, particular embodiments map uplink traffic in the IAB to the desired backhaul radio link control (RLC) channel (or bearer) as well as downlink mapping in the IAB donor node.

A first group of embodiments are based on explicitly indicating, at backhaul RLC channel setup/modification (e.g., in radio resource control (RRC) signaling to the IAB node, or F1 signaling to donor distributed unit (DU)), which types of traffic should be mapped on each backhaul RLC channel. The backhaul RLC channels may be identified using a logical channel identifier (LCID) or specific backhaul RLC channel identifiers. Because multiple types of traffic may share the same backhaul RLC channel, the information may be coded as a list of traffic types (e.g., user data associated with different quality of service (QoS) classes, F1 signaling, etc.) per backhaul RLC channel (more example traffic types are described below).

To support 1:1 mapping between user equipment (UE) bearers and backhaul RLC channels, particular embodiments indicate a specific general packet radio service (GPRS) tunneling protocol (GTP) tunnel endpoint identifier (TEID) to be associated with a backhaul RLC channel. This can be performed in various ways. For example, it can be performed during the setup of a backhaul RLC channel (e.g., in an information element (IE) within the backhaul RLC channel configuration that contains the associated TEID), during the reconfiguration of a backhaul RLC channel (e.g., in an IE within the backhaul RLC channel configuration that contains the associated TEID), or it could be done independently of the backhaul RLC channel configuration (e.g., it could be mapping information kept at radio resource control (RRC) level that contains backhaul RLC channel to TEID mapping, instead of an IE within the backhaul RLC channel configuration that contains the GTP TEID).

N:1 support may also be configured similar to the 1:1 mapping above, the difference being that more than one GTP TEID can be associated with one backhaul RLC channel. This also can be performed in various ways. For example, it can be performed during the setup of a backhaul RLC channel (e.g., in an IE within the backhaul RLC channel configuration that contains the associated TEIDs), during the reconfiguration of a backhaul RLC channel (e.g., in an IE within the backhaul RLC channel configuration that contains the associated TEIDs), or it could be done independently of the backhaul RLC channel configuration (e.g., it could be mapping information kept at RRC level that contains backhaul RLC channel to TEIDs mapping, instead of an IE within the backhaul RLC channel configuration that contains the GTP TEID).

There are pros and cons with signaling GTP TEIDs versus signaling more generic traffic types (e.g., identified with QoS parameter). An advantage of signaling GTP TEIDs is that it facilitates flexible mapping, however a drawback is an increased amount signaling because the TEIDs need to be updated when the UE bearers are added or removed. For these reasons the embodiments described above may be used in a complimentary way. Optionally, some embodiments indicate a "default" backhaul RLC channel (e.g., in the RRC signaling) on which all traffic types not explicitly indicated should be mapped. Accordingly, there is no need to signal mapping for traffic types which are only rarely used, or which do not require any specific QoS treatment.

A limitation of the first group of embodiments is that they are not completely future proof, because if new traffic types (which are identified using new mechanism) are introduced in the future it may be required to update the specifications (e.g., RRC) to add indications for the new traffic types to the standard as well as update all existing implementations in the network to support the new signaling. For this reason, in a second group of embodiments the mapping happens in two steps.

In the first step, the mapping is performed from traffic types or UE bearers to a generic parameter value. The mapping may be controlled by implementation or operator configuration in the IAB node. For end user UE bearer mapping, the first step can also be performed by using F1 signaling from the CU to the DU function of the IAB node (e.g., to provide the mapping from a GTP TEID, 5G QoS indicator (5QI), and/or IP address to a generic parameter).

In the second step, the mapping is performed from the generic parameter value to backhaul RLC channels. The second step may be configured by CU (e.g., using RRC signaling). It is also possible to configure mapping from several values of the generic parameter to the same backhaul RLC channel.

The generic parameter value may comprise an IPv4 differentiated services code point (DSCP) or an IPv6 flow label. Alternatively, the generic parameter may be an integer of any length (e.g., 8 bits). Using DSCP or flow labels is advantageous, for example, when the IAB node provides IP services to external nodes (e.g., Wi-Fi access points, CCTV camera which do use DSCP or flow label). An integer also works in those cases because the IAB node can map from DSCP or flow label to the integer.

These embodiments are future proof because the operator may introduce new traffic types by configuring a mapping to a generic parameter value making it possible to configure the mapping via RRC to backhaul RLC channel There is no need to change specifications (e.g., RRC specification or implementation).

In addition to the bearer mapping within a specific link, particular embodiments may use similar mechanisms as described above to control the mapping to multiple links for IAB nodes which are connected via more than one link. An example of this is to map certain traffic (e.g., F1-AP signalling) on one link, while the data is sent on another link.

According to some embodiments, a first network node in an IAB network comprising an IAB donor CU network node, IAB donor DU network node, and at least one of an access IAB network node and an intermediate IAB network node performs a method. The method comprises receiving a backhaul channel configuration from a second network node. The backhaul channel configuration comprises a mapping of one or more traffic identifiers to one or more wireless backhaul channels. The method further comprises receiving incoming traffic on an ingress link for transmission on a wireless backhaul channel, determining the wireless backhaul channel on an egress link for transmitting the incoming traffic based on a type of the incoming traffic and the mapping of one or more traffic identifiers to one or more wireless backhaul channels, and transmitting the received incoming traffic on the determined wireless backhaul channel on the egress link.

In particular embodiments, receiving the backhaul channel configuration comprises receiving RRC signaling or F1 signaling from the second network node.

In particular embodiments, the traffic identifier comprises a traffic type. For example, the traffic type may comprise one or more of F1 traffic, OAM traffic, GTP traffic, and a 5QI. In particular embodiments, the traffic identifier comprises a GTP TEID. In particular embodiments, the backhaul channel configuration further comprises an identification of a default wireless backhaul channel.

In particular embodiments, each of the one or more traffic identifiers comprise first traffic identifiers and the method further comprises receiving a mapping of one or more second traffic identifiers to the one or more first traffic identifiers. Determining the wireless backhaul channel on the egress link for transmitting the incoming traffic is based on the mapping of one or more second traffic identifiers to the one or more first traffic identifiers and the mapping of the one or more first traffic identifiers to the one or more wireless backhaul channels.

In particular embodiments, the one or more first identifiers comprise one of a DSCP and an IP flow label.

In particular embodiments, the second traffic identifier comprises a traffic type. In particular embodiments, the traffic type comprises one or more of F1 traffic, OAM traffic, GTP traffic, and a 5QI. In particular embodiments, the second traffic identifier comprises a GTP TEID.

In particular embodiments, the mapping of one or more second traffic identifiers to the one or more first traffic identifiers further comprises an identification of a default first traffic identifier.

In particular embodiments, the first network node is the access IAB network node and the second network node is the IAB donor CU.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments facilitate configuration of the mapping of end user bearers to backhaul RLC channels in an IAB node even if the backhaul RLC channels are controlled by another node and the mapping is changed dynamically.

Particular embodiments support mapping both based on traffic types (e.g., F1 signaling, OAM, data with 5QI=1, etc.) and specific mapping for specific bearers (e.g., identified by GTP TEID). Some embodiments map different types of traffic on the same backhaul RLC channel (e.g., signal a list of traffic types or GTP TEIDs that should be mapped on the same backhaul RLC channel).

Particular embodiments are signaling efficient in that only traffic types that require a specific mapping need to be signaled, while other traffic types will use default backhaul RLC channel (which could be hardcoded e.g. backhaul RLC channel 1 or indicated via signaling).

A particular advantage of some embodiments is forward compatability in that the operator may introduce new traffic types and still support configurable mapping to backhaul RLC channel without changes in RRC/F1 specifications.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
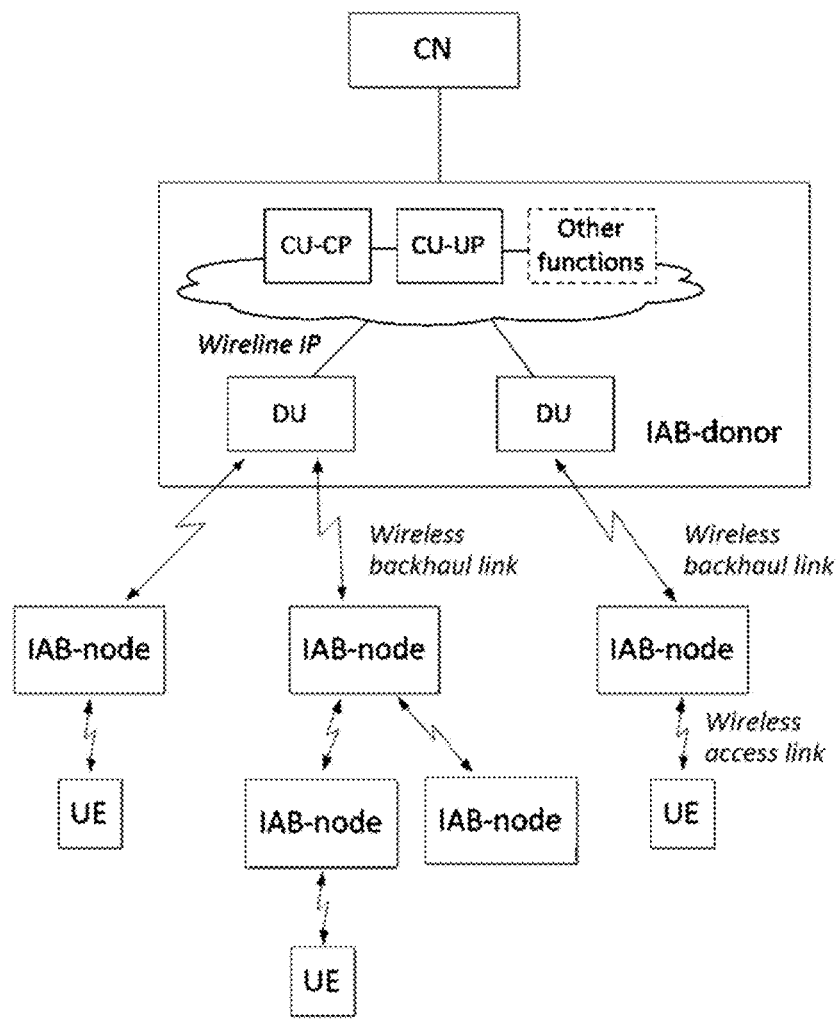
FIG. 1 is a reference diagram for IAB in standalone mode, which contains one IAB-donor and multiple IAB-nodes.
Figure 2:
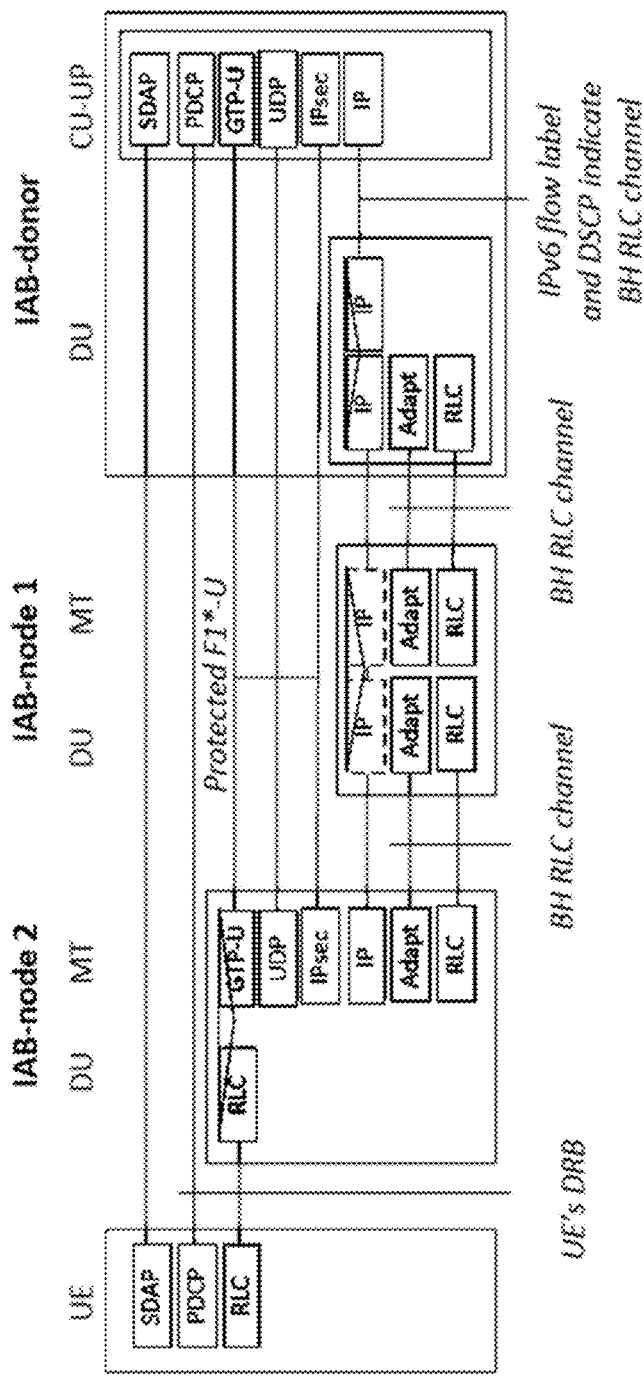
FIG. 2 illustrates the baseline user plane protocol stacks for IAB.
Figure 3A:
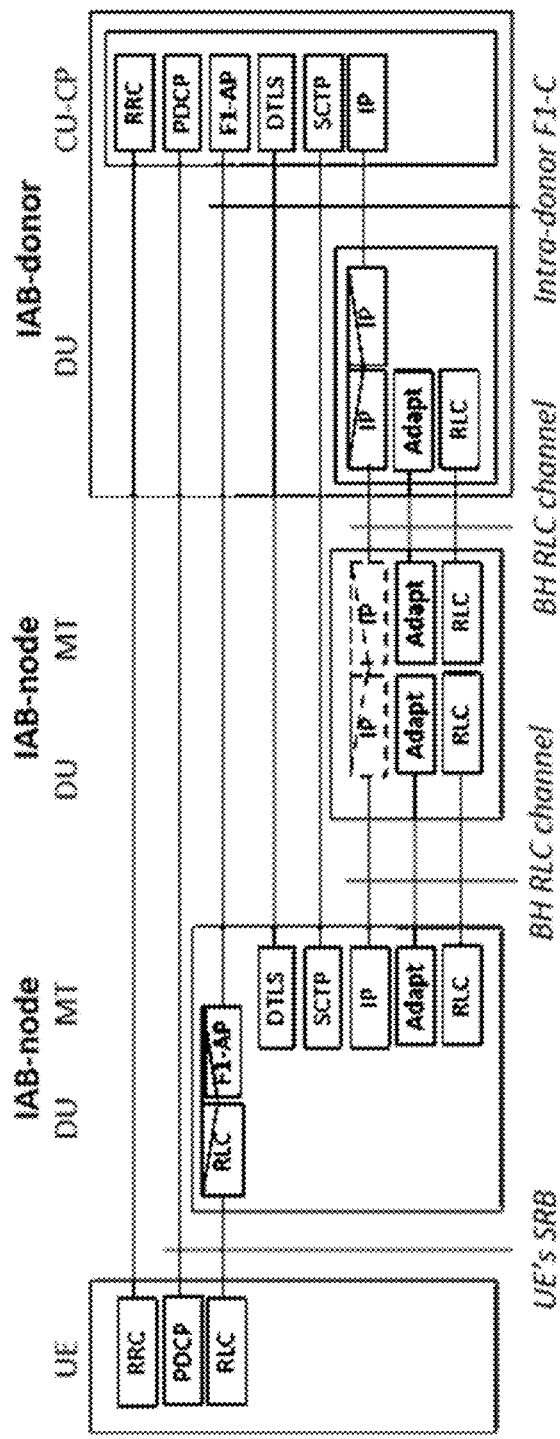
FIGS. 3A-3C illustrate the baseline control plane protocol stacks for IAB.
Figure 3B:
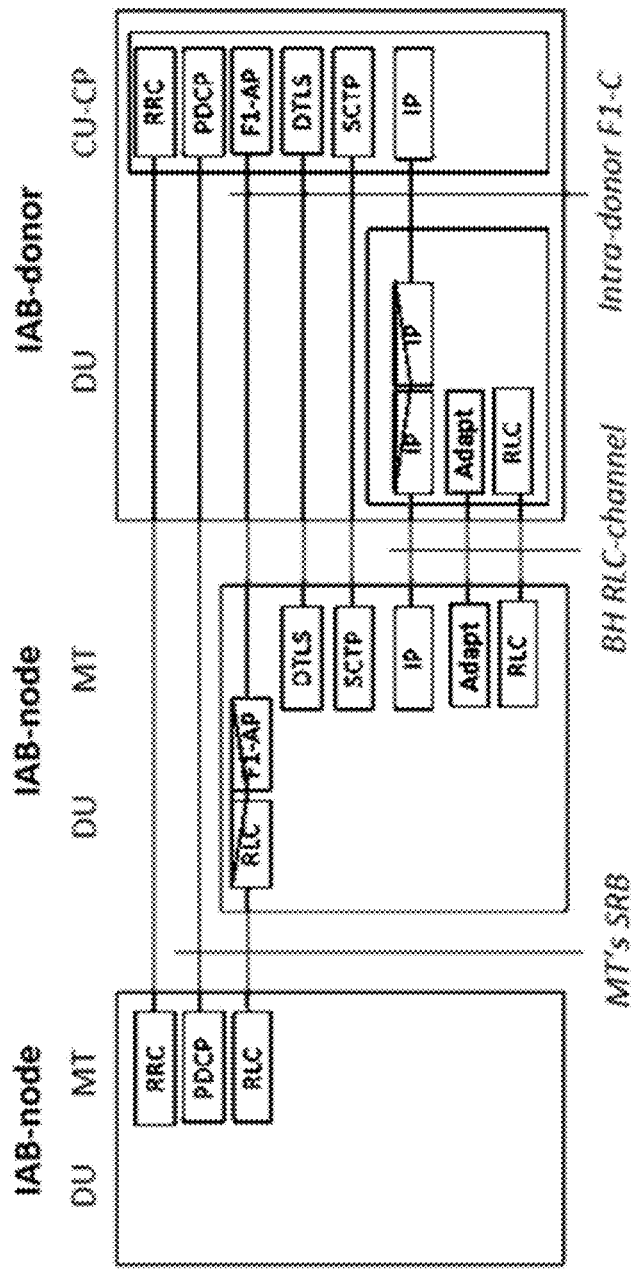
Figure 3C:
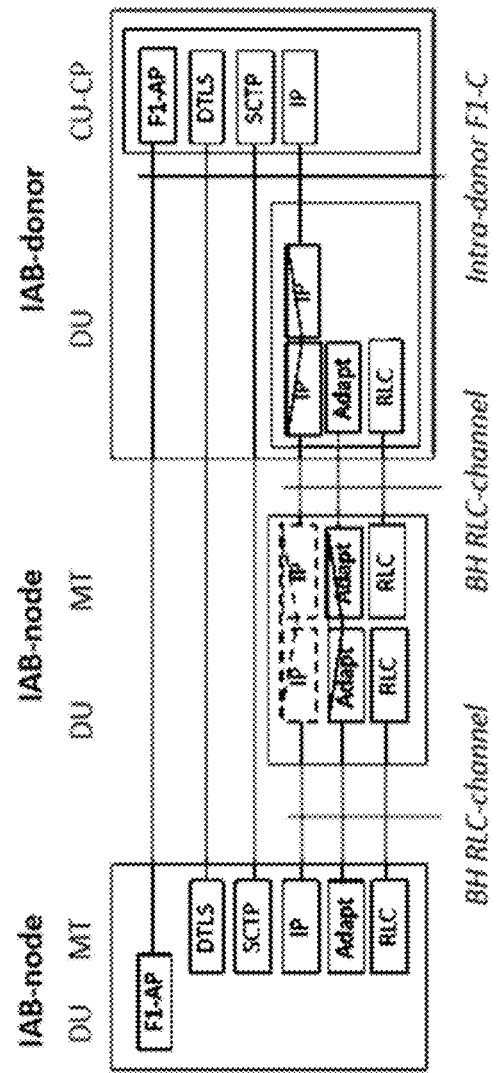
Figure 4:
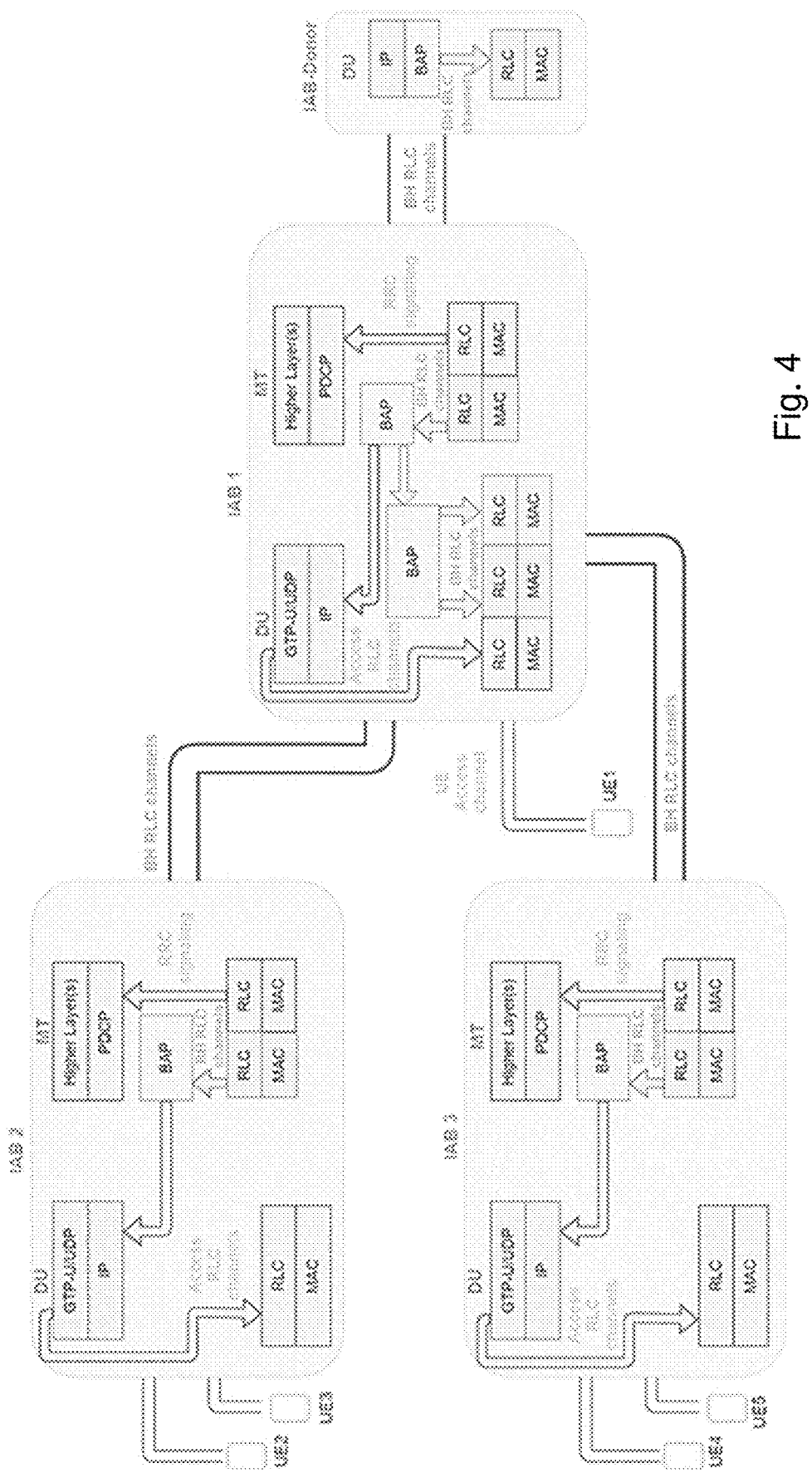
FIG. 4 is a flow diagram illustrating an example of bearer mapping in IAB nodes for downstream transmission.
Figure 5:
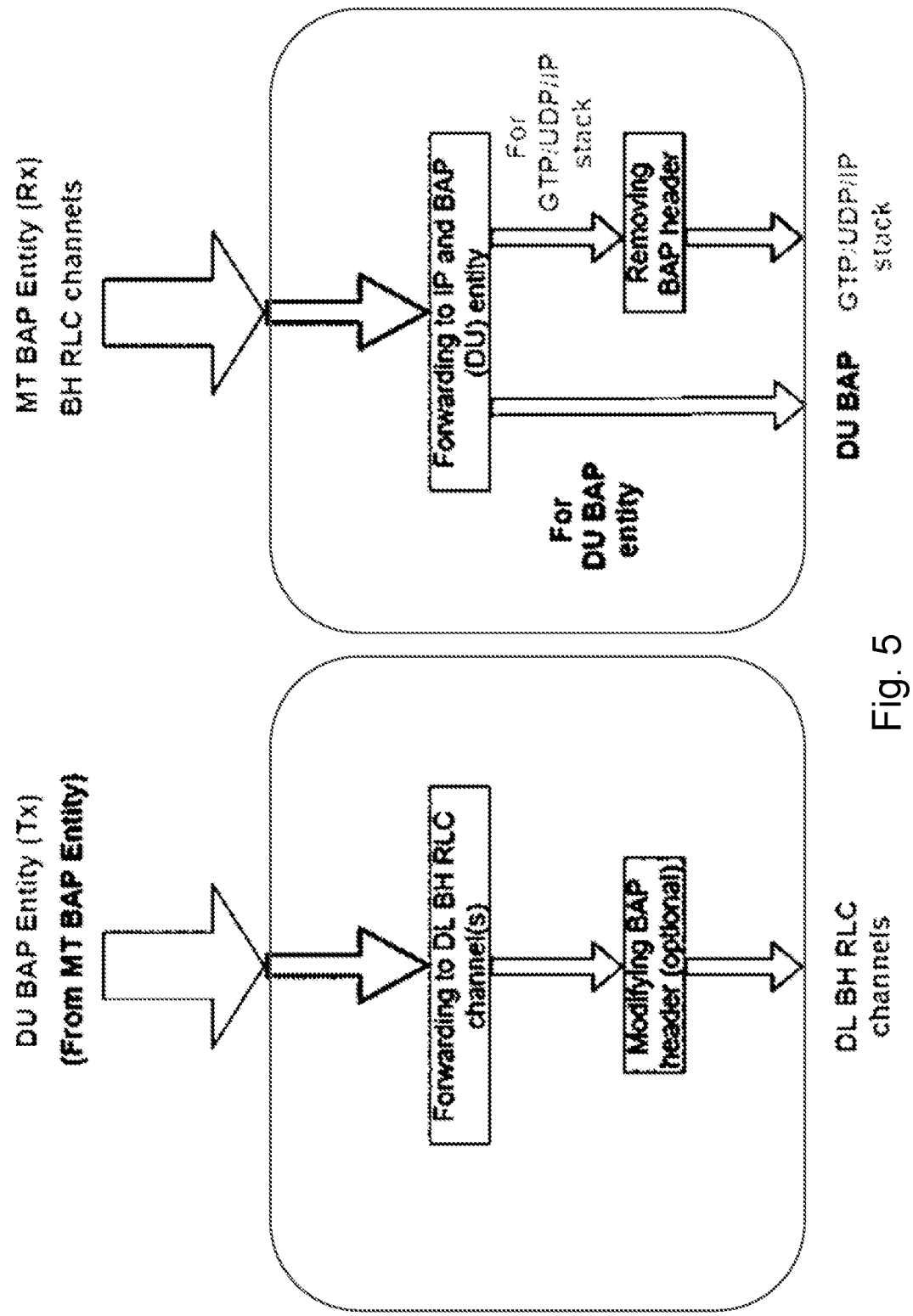
FIG. 5 is a flow diagram illustrating an example of the functions performed by BAP entities for downstream transmission.
Figure 6:
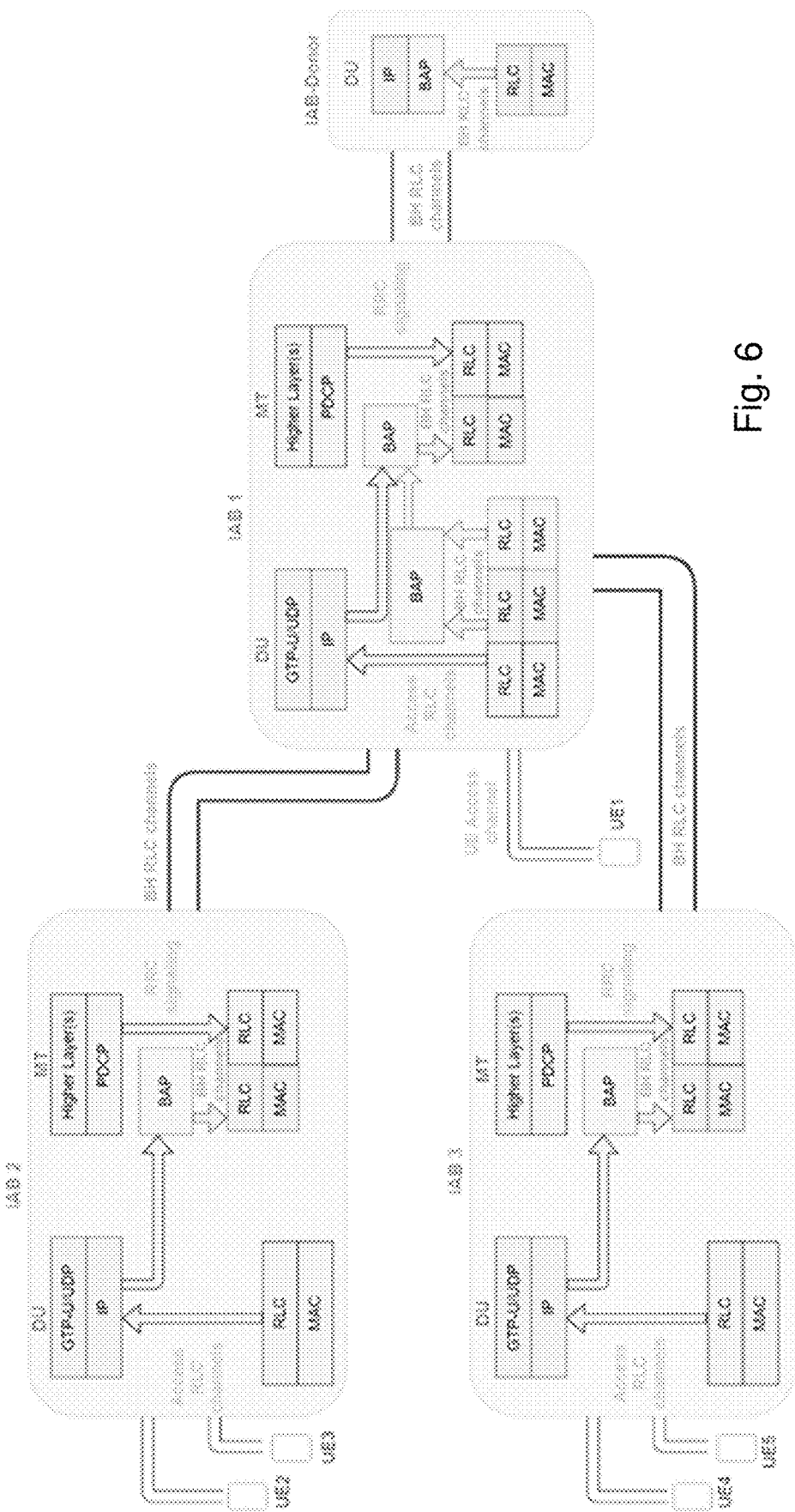
FIG. 6 is a flow diagram illustrating an example of bearer mapping in IAB nodes for upstream transmission.
Figure 7:
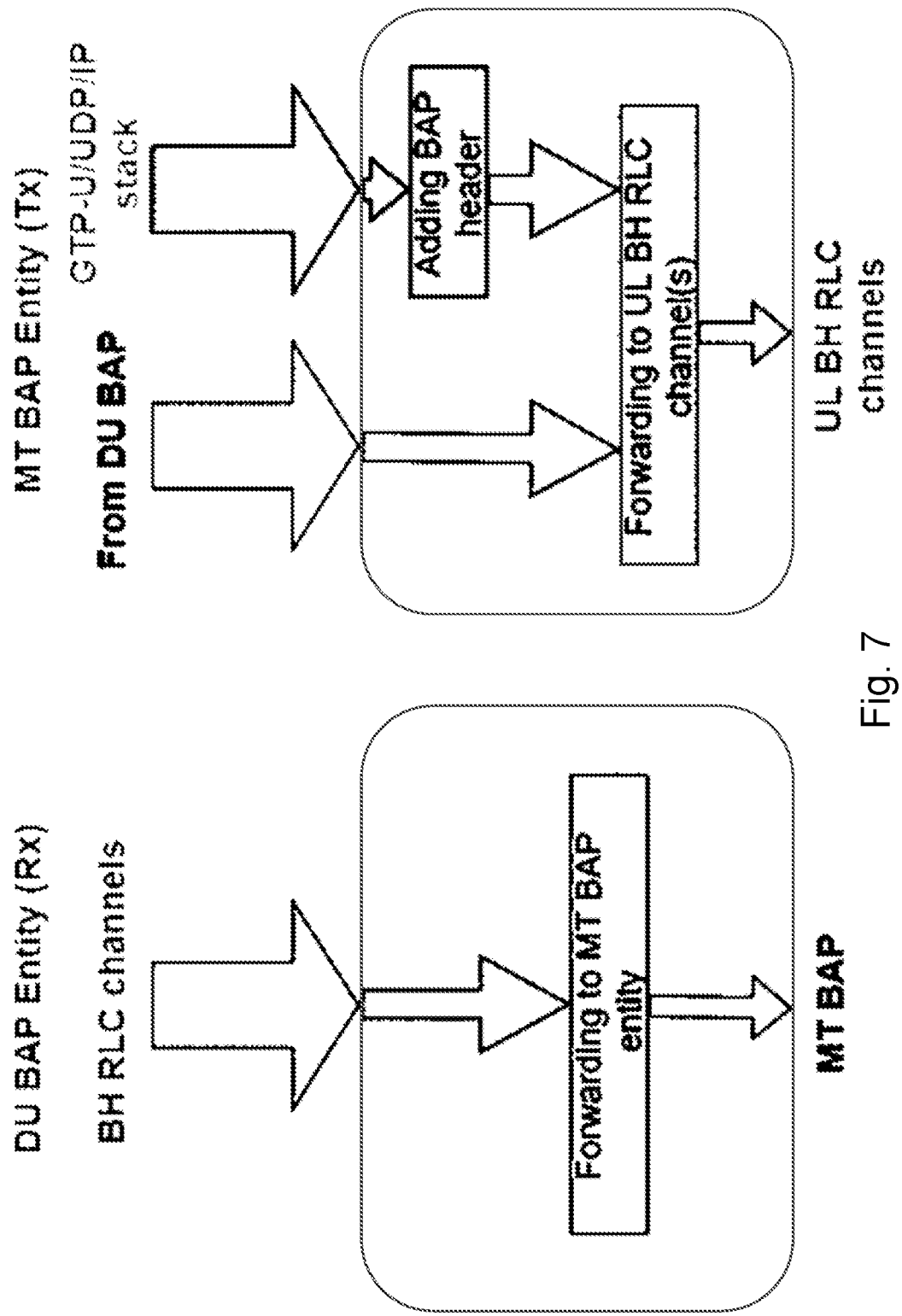
FIG. 7 is a flow diagram illustrating an example of the functions performed by BAP entities for upstream transmission.
Figure 8:
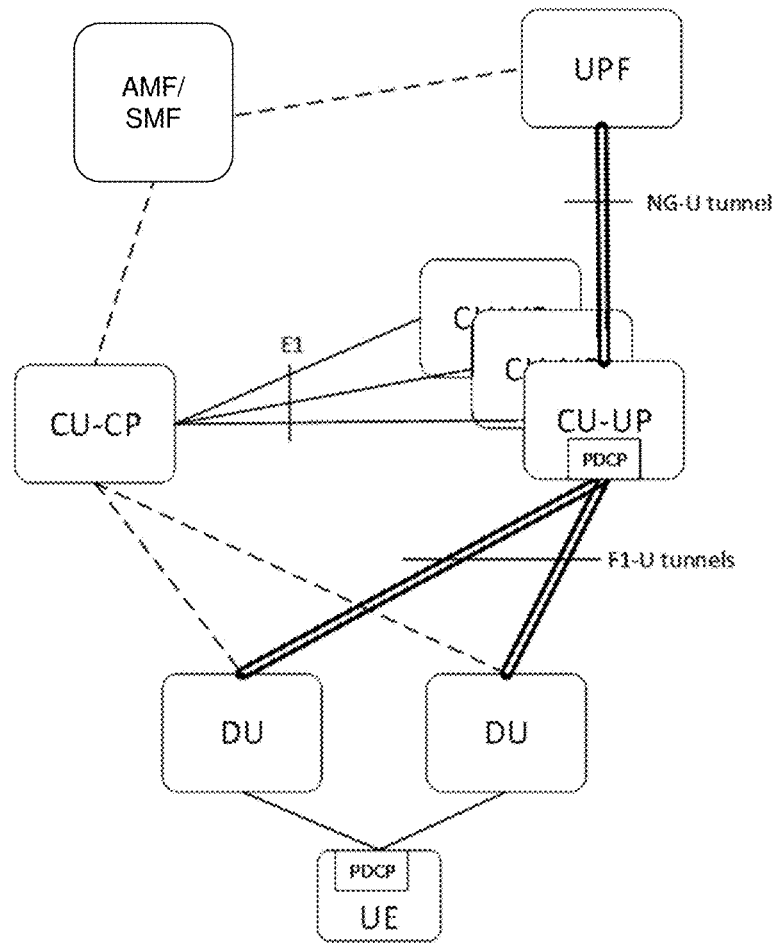
FIG. 8 is functional diagram illustrating NR dual connectivity to UEs.
Figure 9:
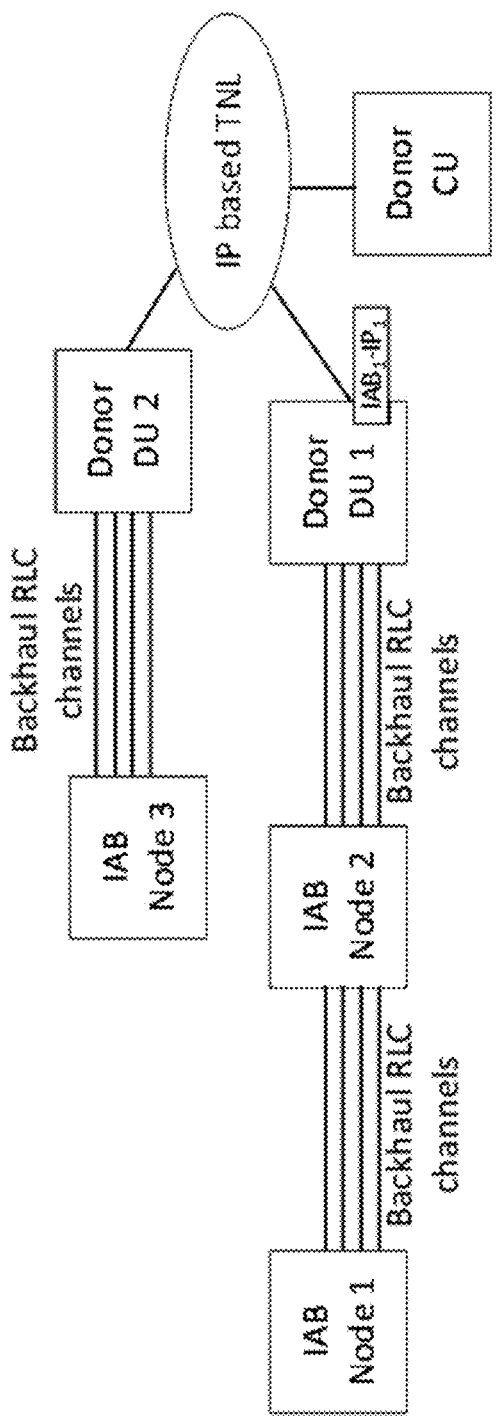
FIG. 9 is a connectivity diagram illustrating single connectivity before DC is setup.
Figure 10:
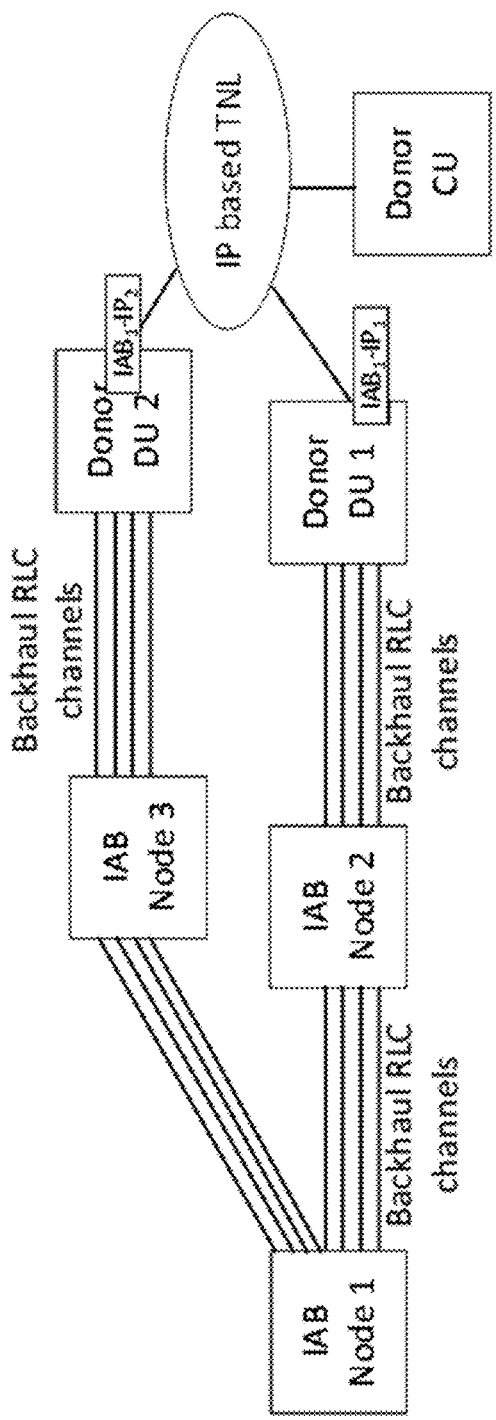
FIG. 10 is a connectivity diagram illustrating multiple connectivity after DC setup
Figure 11:
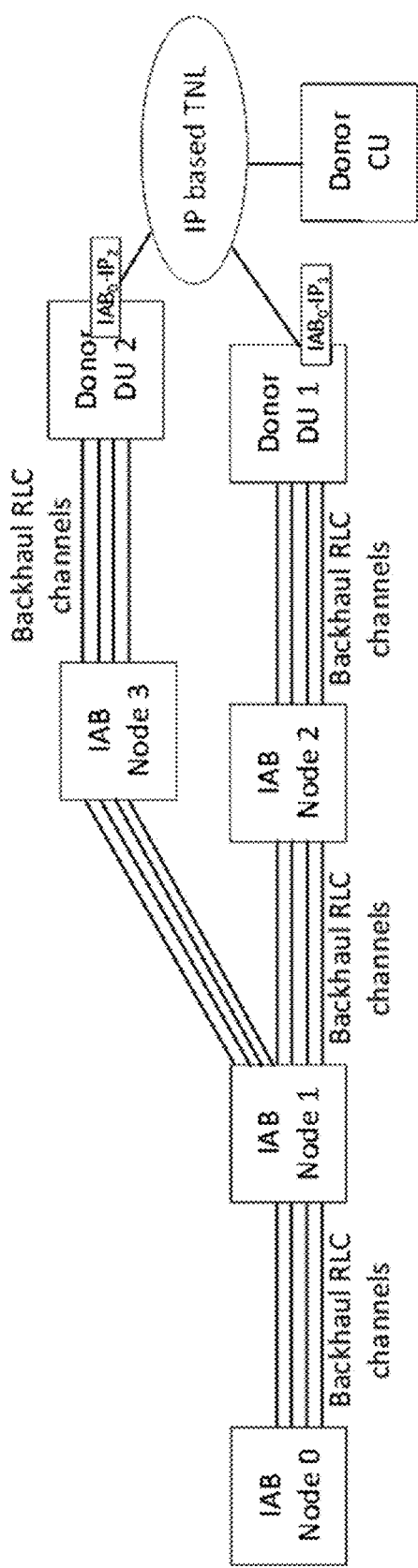
FIG. 11 is a connectivity diagram illustrating multiple connectivity at intermediate nodes, leading to multiple connectivity of end nodes.
Figure 12:
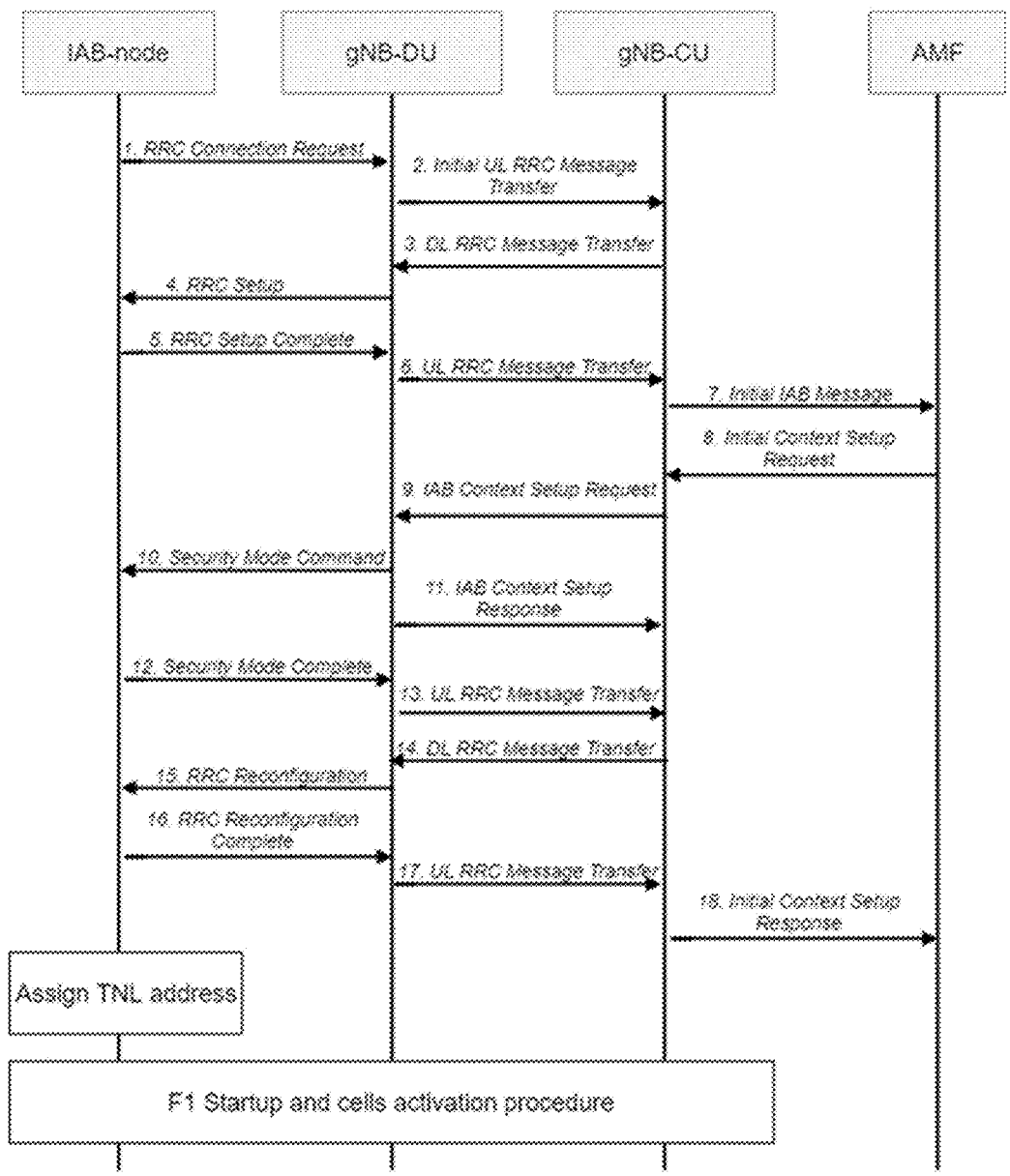
FIG. 12 is a sequence diagram illustrating an IAB node integration procedure.
Figure 13:
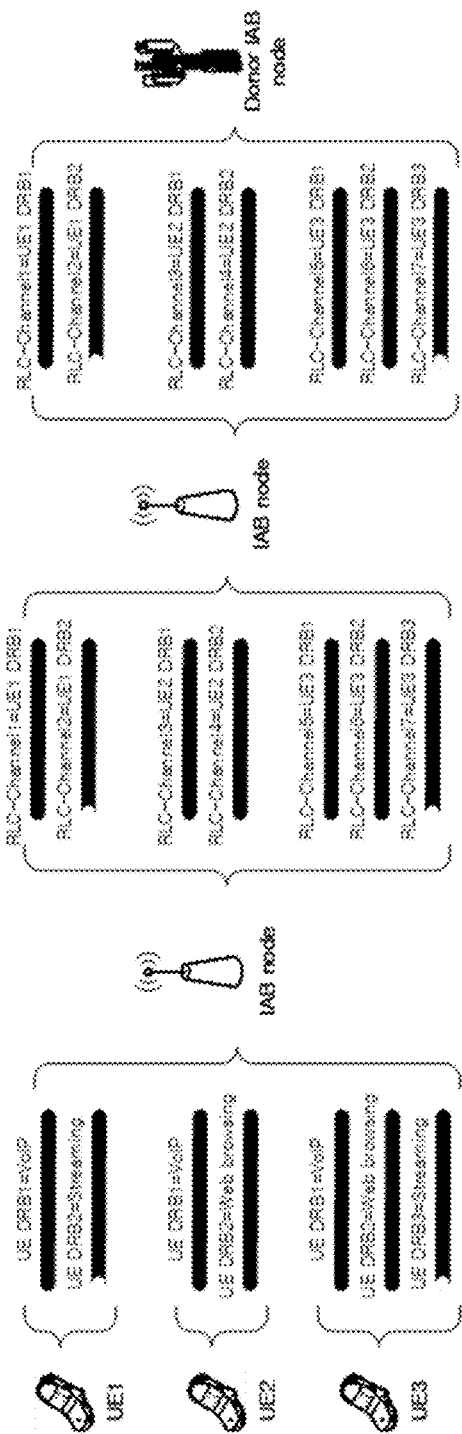
FIG. 13 is a mapping diagram illustrating an example of one-to-one mapping between UE DRB and backhaul RLC channel.
Figure 14:
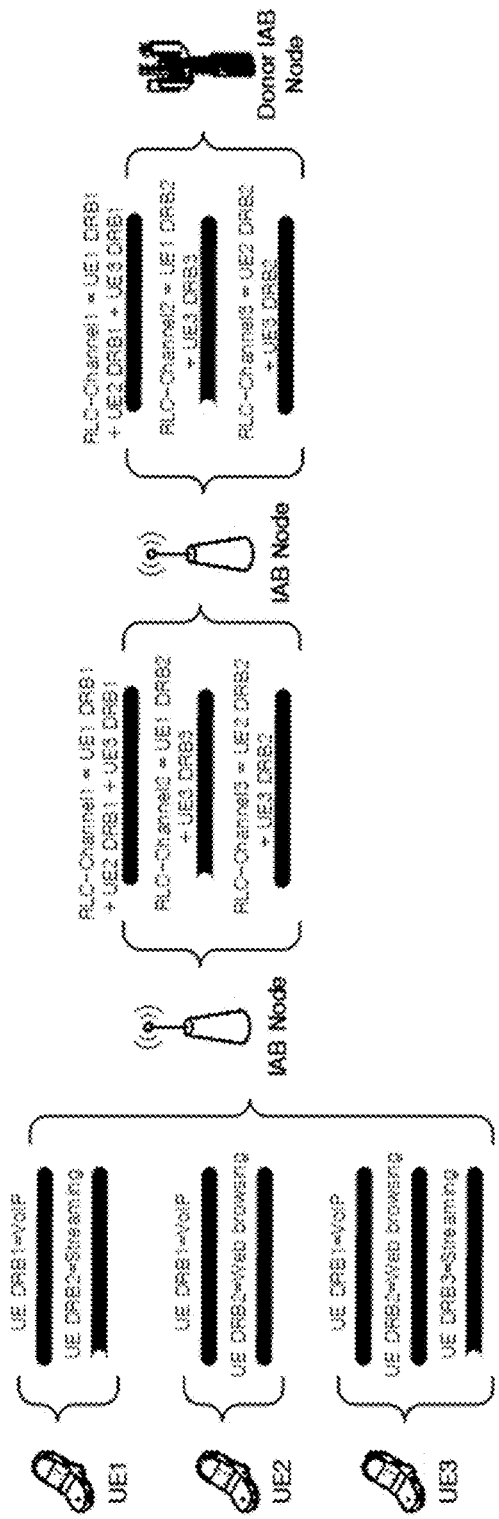
FIG. 14 is a mapping diagram illustrating an example of many-to-one mapping between UE DRBs and backhaul RLC channel.

As described above, certain challenges currently exist with mapping traffic to integrated access and backhaul (IAB) backhaul channels. Certain aspects of the present disclosure and their embodiments may provide solutions to these or other challenges.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The terms "setup" and "configure" may be used interchangeably herein. The terms "backhaul RLC channel" and "backhaul RLC bearer" may also be used interchangeably herein.

In a first group of embodiments, the central unit (CU) is responsible for managing backhaul radio link control (RLC) channels to the IAB node. The backhaul RLC channel management as well as the backhaul RLC channel mapping in the uplink may configured via the radio resource control (RRC) protocol to the mobile termination (MT) part of the IAB node.

The RRC protocol may provide information to the MT enabling the MT to map different types of traffic to a backhaul RLC channel, such as: (a) map traffic received from IAB child nodes (e.g., based on ingress bearer); (b) map F1-C signaling; (c) map operations and management (OAM) traffic; and (d) map F1-U tunnels (identified by GTP TEID) associated with user equipment (UE) data radio bearers (DRBs) connected to the IAB node.

The mapping in intermediate IAB nodes based on ingress bearers may use the same logical channel identifier (LCID). Particular embodiments use RRC to signal the mapping of F1-C, F1-U and other traffic to an access IAB node.

When the backhaul RLC channel is setup, some embodiments define explicit traffic types (e.g., F1-C, OAM, GTP TEID, "other", etc.) to indicate which traffic should be mapped on each channel A limitation is that in some cases the operator may want several types of traffic to share the same backhaul RLC channel, making the signaling more complex (e.g., requiring a list of lists). The GTP TEID is a dynamic parameter meaning that when a new UE bearer is added the GTP TEID would need to be signaled on RRC level to the IAB MT to handle the mapping to the backhaul RLC channel even if the UE bearers should be mapped on an already existing backhaul RLC channel.

A second group of embodiments includes an intermediate step where the traffic is first mapped to an intermediate identifier (e.g., differentiated services code point (DSCP)/ flow label) based on F1-C signaling and/or OAM and then RRC configures a mapping from the intermediate parameters to a backhaul RLC channel.

In the example below "Px" denotes the intermediate identifier:

| First mapping: | RRC configuration: |
|---|---|
| OAM configuration: | |
| F1-C => P1 | P1 => BH RLC channel 1 |
| OAM => P2 | P2 => BH RLC channel 2 |
| F1-U 5QI = 1 (voice) or LTE QCI = 1 => P3 | P3 => BH RLC channel 3 |
| F1-U 5QI = 3 (gaming) => P4 | P4 => BH RLC channel 4 |
| F1-U 5QI = 66 (non-critical PTT) => P4 | |
| F1-U 5QI = 8 or UTE QCI = 6 (TCP) => P5 | P5 => BH RLC channel 5 |
| F1-U 5QI = 213 (Operator defined) => P6 | P6 => BH RLC channel 6 |
| F1-AP configuration (at bearer setup): | |
| F1-U GTP TEID = 4711 => P7 | P7 => BH RLC channel 7 |

The second group of embodiments includes the following advantages. When a new UE bearer is added that uses a fifth generation (5G) quality of service (QoS) indication (5QI) that can be mapped on an existing backhaul RLC channel, there is no need to perform any RRC signaling. Particular embodiments support backhauling of long term evolution (LTE) traffic or any other traffic to different backhaul RLC channels based on operator configuration. An operator may support mapping for operator defined 5QIs. Particular embodiments may support 1:1 mapping by configuring the parameter using F1-AP signaling.

Any intermediate parameter could be used for this (e.g., an integer of sufficient size). As another example, similar to the donor DU mapping to backhaul RLC channels based on DSCP/flow labels, particular embodiments may also use it for uplink mapping in the IAB node.

Using a two-step mapping for uplink traffic in the IAB node has several advantages. It enables the operator to backhaul new traffic types in the future and map this traffic to backhaul RLC channels without going through 3GPP standardization. It supports all traffic types F1-C, F1-U (both 1:1 and N:1 mapping), OAM, LTE backhauling, etc. It avoids RRC signaling (causing latency) in case a new UE bearer is added which can be mapped to an existing backhaul RLC channel.

To optimize the signaling, particular embodiments may either pre-configure and/or signal an indication associated with one backhaul RLC channel that the backhaul RLC channel is the default channel In this way the node performing the uplink or downlink mapping may map all traffic associated with parameter values which there is no configured mapping to the default backhaul RLC channel. The default indication can be included for uplink mapping in the IAB node in RRC signaling and in the downlink in F1-AP signaling to the donor DU. Alternatively, the default backhaul RLC channel can be configured in the DU or IAB node directly.

Figure 15:
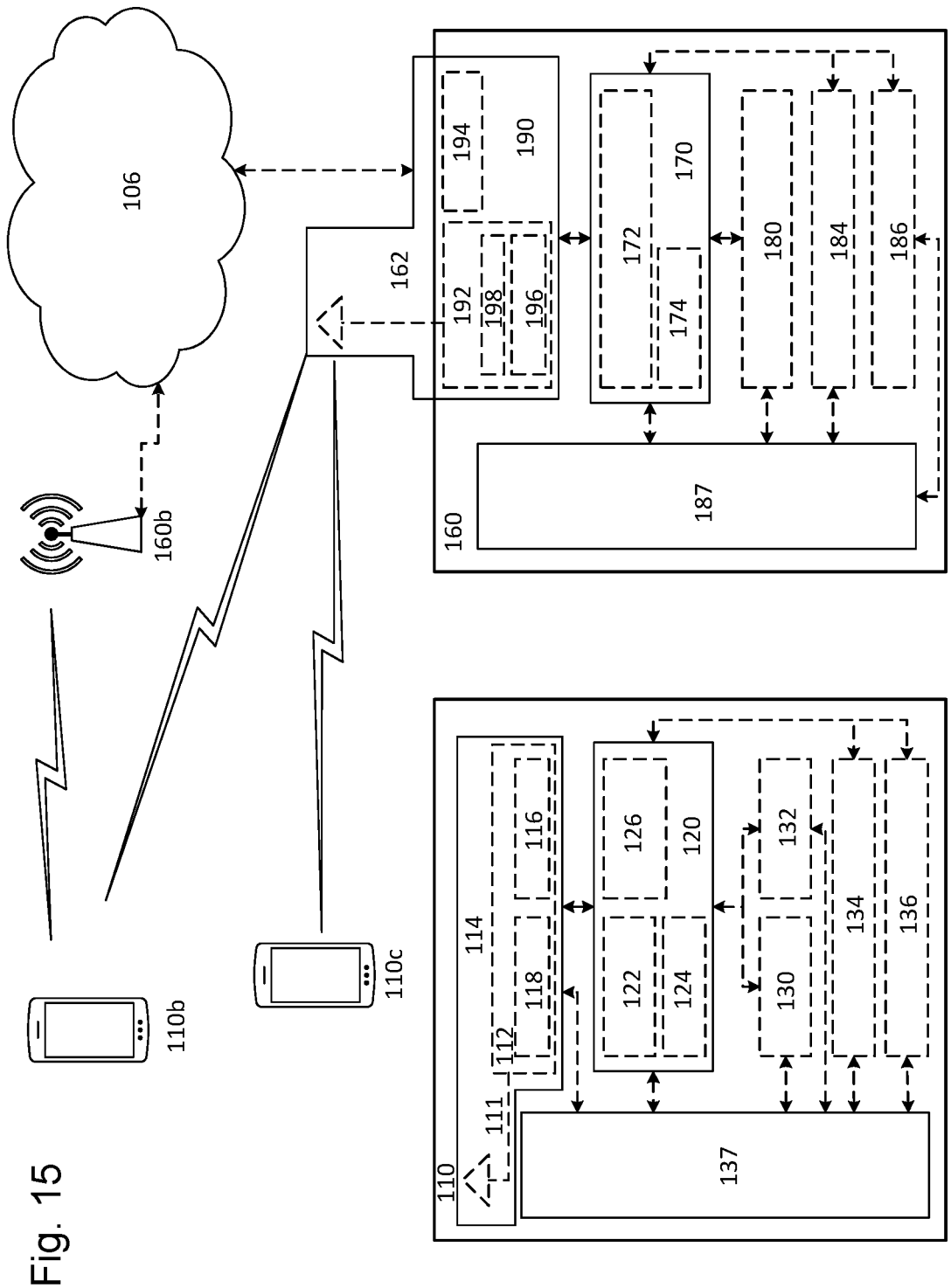
FIG. 15 is a block diagram illustrating an example wireless network.

FIG. 15 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), New Radio (NR), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 160 includes processing circuitry 170, device readable medium 180, interface 190, auxiliary equipment 184, power source 186, power circuitry 187, and antenna 162. Although network node 160 illustrated in the example wireless network of FIG. 15 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB, gNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 15 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 16:
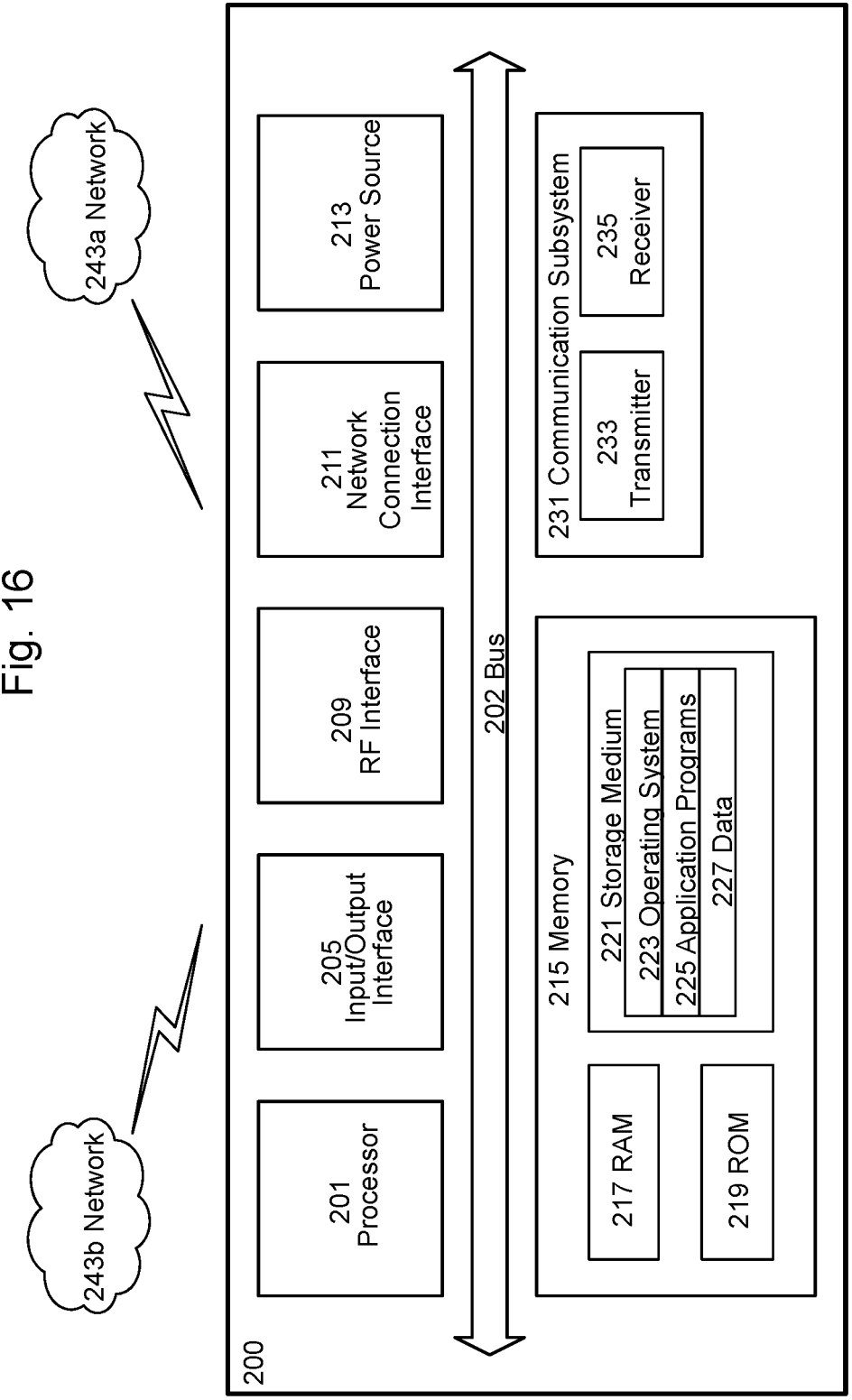
FIG. 16 illustrates an example network node, according to certain embodiments.

FIG. 16 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or NR standards. As mentioned previously, the term WD and UE may be used interchangeable. Accordingly, although FIG. 16 is a UE, the components discussed herein are equally applicable to a WD, and vice-versa.

In FIG. 16, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 16, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 17:
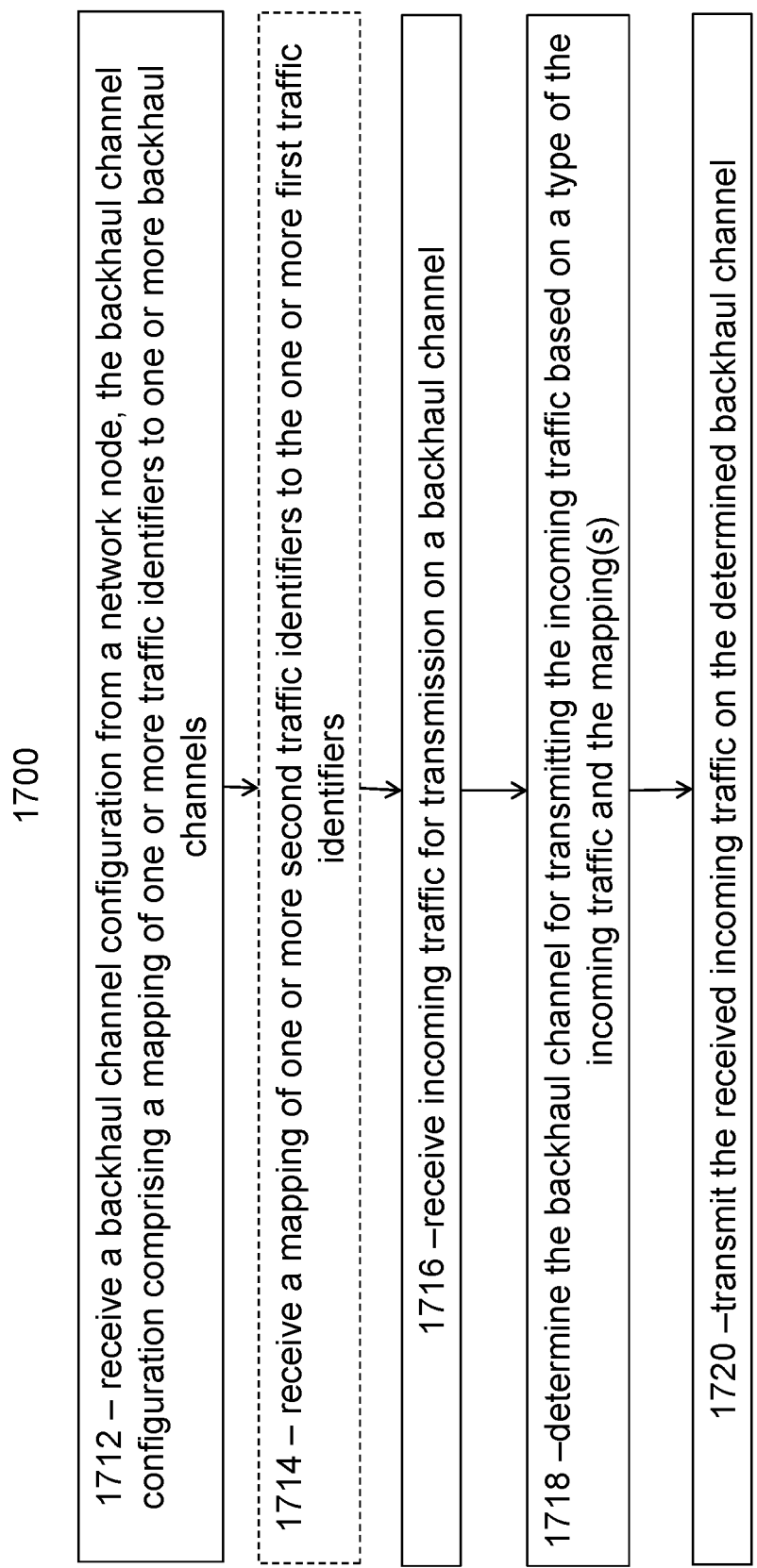
FIG. 17 is a flowchart illustrating an example method in a network node, according to certain embodiments.

FIG. 17 is a flowchart illustrating an example method in a network node, according to certain embodiments. In particular embodiments, one or more steps of FIG. 17 may be performed by network node 160 described with respect to FIG. 15. The network node comprises an IAB network node.

The method begins at step 1712, where the network node (e.g., network node 160) receives a backhaul channel configuration from a second network node. The backhaul channel configuration comprises a mapping of one or more traffic identifiers to one or more wireless backhaul channels.

For example, receiving the backhaul channel configuration may comprise receiving RRC signaling or F1 signaling from the second network node. The type of signaling depends on the type of network node (e.g., access IAB node, intermediate IAB node, donor IAB node, etc.).

In some embodiments, the backhaul channel configuration may be received for each wireless backhaul channel as the backhaul channel is configured or reconfigured. In some embodiments, the network node may receive a mapping for all wireless backhaul channels in one configuration (e.g., a table mapping one or more traffic identifiers to one or more wireless backhaul channels).

In some embodiments, receiving the backhaul channel configuration may comprise receiving the configuration from a network operator over a provisioning interface. The network node may receive the backhaul configuration according to any of the embodiments and examples described above.

In particular embodiments, the traffic identifier comprises a traffic type. For example, the traffic type may comprise one or more of F1 traffic, OAM traffic, GTP traffic, and a 5QI. The mapping associates particular traffic types with one or more wireless backhaul channels.

In other embodiments, the traffic identifier comprises a GTP TEID. The mapping associates particular tunnels with one or more wireless backhaul channels.

The association of traffic identifiers with wireless backhaul channels may be based on QoS properties of the traffic and the wireless backhaul channel. The backhaul channel configuration may comprise a 1:1 or many-to-many mapping according to any of the embodiments and examples described above.

In particular embodiments, the backhaul channel configuration further comprises an identification of a default wireless backhaul channel. For example, a traffic type not explicitly associated to any wireless backhaul channel may be associated with the default wireless backhaul channel Use of a default wireless backhaul channel simplifies signaling and configuration.

Some embodiments may comprise a one-step mapping of traffic identifier to wireless backhaul channel Other embodiments may comprise a two-step mapping of traffic identifier to wireless backhaul channel. For example, the traffic identifiers received in step 1712 may comprise a first traffic identifier, which may comprise a general identifier such as an integer, DSCP, IP flow label, etc. Such embodiments may include optional step 1714.

At step 1714, the network node may receive a mapping of one or more second traffic identifiers to the one or more first traffic identifiers. For example, the first traffic identifier may associate general classes of traffic with each wireless backhaul channel A network operator may configure the network node with a mapping of specific traffic types to the general classes of traffic, resulting in a two-step mapping of first identifier to second identifier to wireless backhaul channel. The second traffic identifier may comprise any of the traffic identifiers described above with respect to step 1712, or any other identifier described in the embodiments and examples above.

At step 1716, the network node receives incoming traffic on an ingress link for transmission on a wireless backhaul channel on an egress link. For example, an IAB donor node may receive downlink traffic destined for a UE, an IAB access node may receive uplink traffic from a UE and destined for an IAB donor node, an IAB intermediate node may receive uplink or downlink traffic, etc. In whichever direction, the network node needs to relay the traffic over a wireless backhaul channel.

At step 1718, the network node determines the wireless backhaul channel for transmitting the incoming traffic based on a type of the incoming traffic and the mapping of one or more traffic identifiers to one or more wireless backhaul channels. For example, in a one-step process, the network node may directly map the ingress traffic to a wireless backhaul channel based on a traffic type of the ingress traffic or an identifier of a channel on which the ingress traffic was received. In a two-step process, the network node may determine the wireless backhaul channel using the two step mapping described with respect to step 1714.

At step 1720, the network node transmits the received incoming traffic on the determined wireless backhaul channel on the egress link.

Modifications, additions, or omissions may be made to method 1700 of FIG. 17. Additionally, one or more steps in the method of FIG. 17 may be performed in parallel or in any suitable order.

Figure 18:
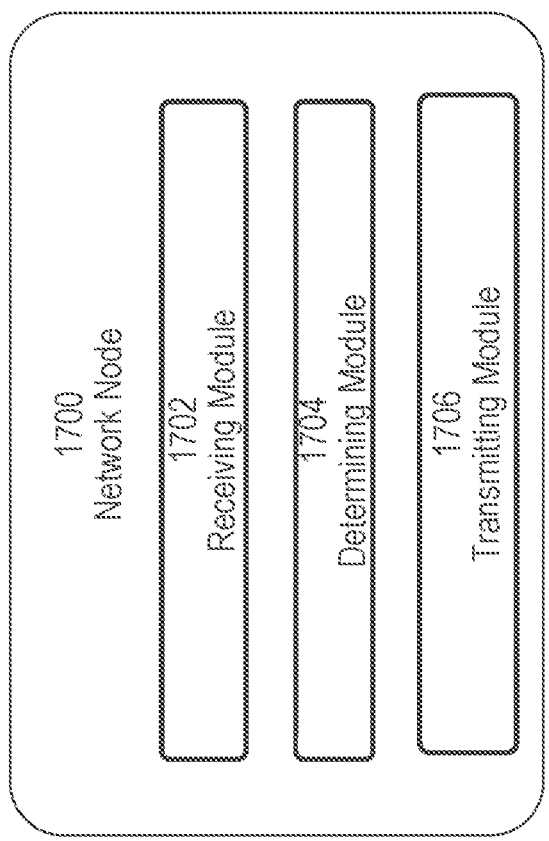
FIG. 18 illustrates a schematic block diagram of a network node in a wireless network, according to certain embodiments.

FIG. 18 illustrates a schematic block diagram of an apparatus in a wireless network (for example, the wireless network illustrated in FIG. 15). The apparatus includes a network node (e.g., network node 160 illustrated in FIG. 15). Apparatus 1700 is operable to carry out the example method described with reference to FIG. 17, and possibly any other processes or methods disclosed herein. It is also to be understood that the method of FIG. 17 is not necessarily carried out solely by apparatus 1700. At least some operations of the methods can be performed by one or more other entities.

Virtual apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1702, determining module 1704, transmitting module 1706, and any other suitable units of apparatus 1700 to perform corresponding functions according one or more embodiments of the present disclosure.

As illustrated in FIG. 18, apparatus 1700 includes receiving module 1702 configured to receive incoming traffic and backhaul channel configuration, according to any of the embodiments and examples described herein. Determining module 1704 is configured to determining a wireless backhaul channel for relaying incoming traffic according to any of the embodiments and examples described herein. Transmitting module 1706 is configured to relay incoming traffic on a wireless backhaul channel on an egress link, according to any of the embodiments and examples described herein.

Figure 19:
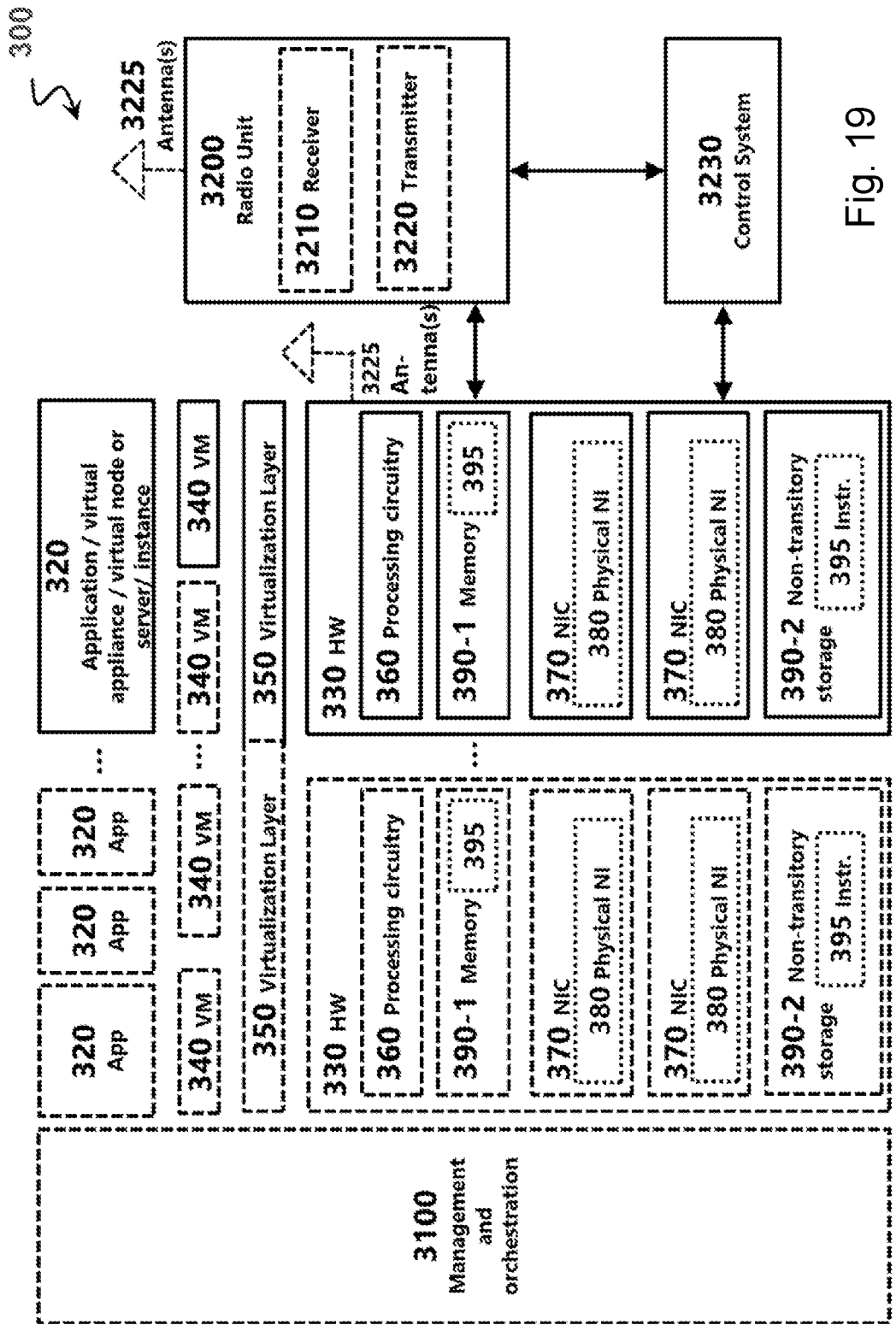
FIG. 19 illustrates an example virtualization environment, according to certain embodiments.

FIG. 19 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 19, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 19.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station. In some embodiments, some signaling can be effected with the use of control system 3230 which may alternatively be used for communication between the hardware nodes 330 and radio units 3200.

Figure 20:
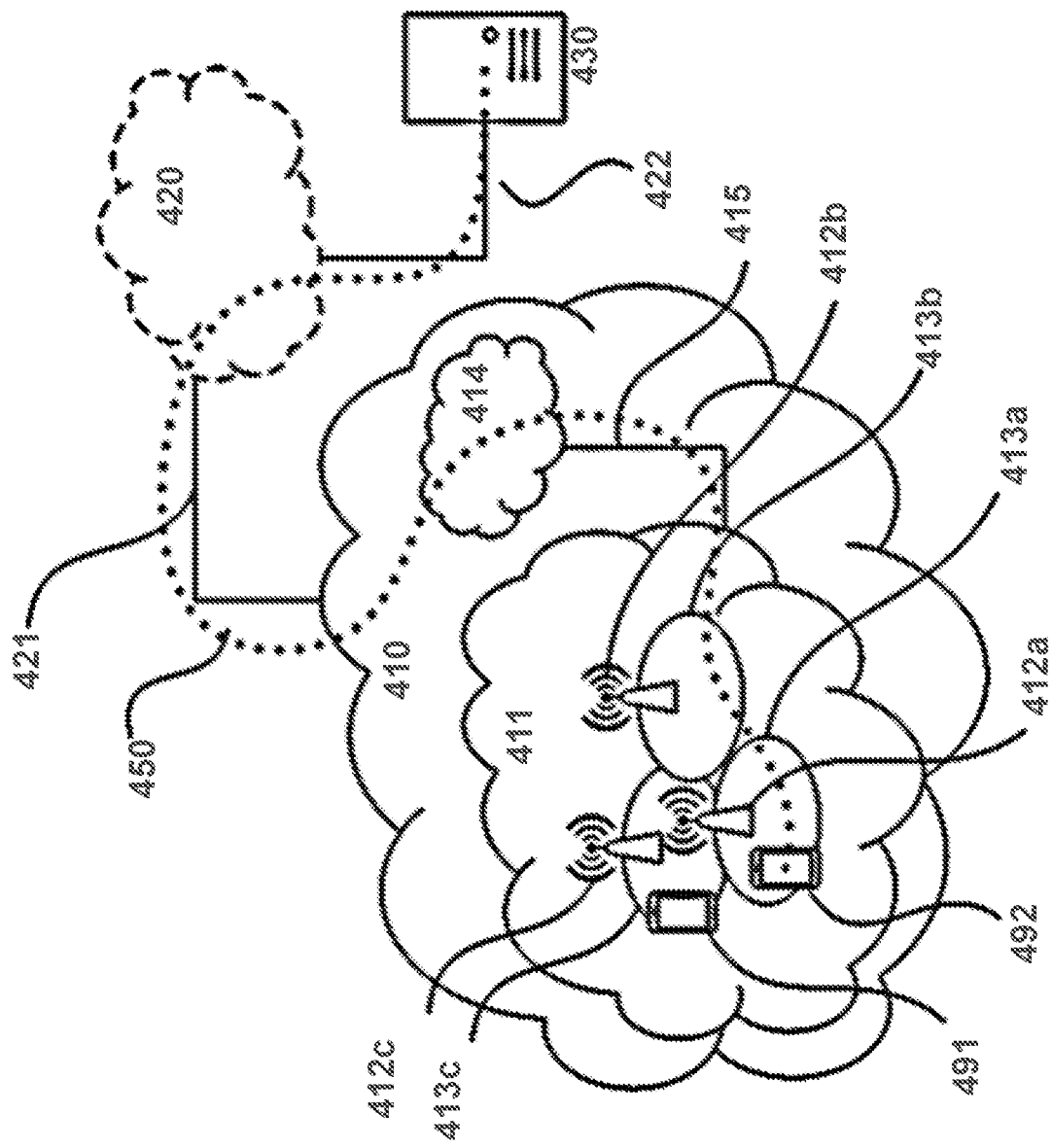
FIG. 20 illustrates an example telecommunication network connected via an intermediate network to a host computer, according to certain embodiments.

With reference to FIG. 20, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 20 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 21:
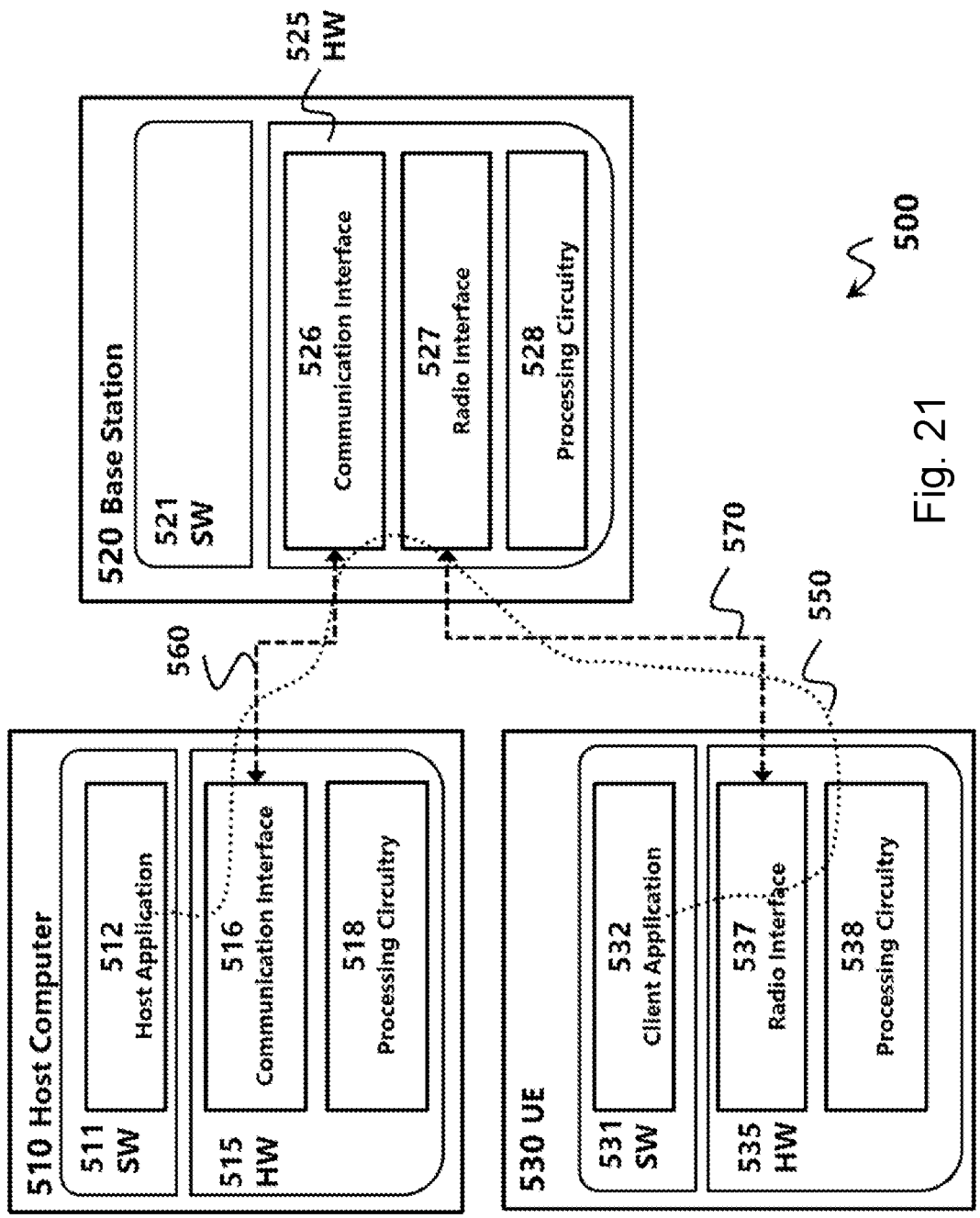
FIG. 21 illustrates an example host computer communicating via a base station with a user equipment over a partially wireless connection, according to certain embodiments.

FIG. 21 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 21. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 21) served by base station 520. Communication interface 526 may be configured to facilitate connection 560 to host computer 510. Connection 560 may be direct, or it may pass through a core network (not shown in FIG. 21) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 19 may be similar or identical to host computer 430, one of base stations 412a, 412b, 412c and one of UEs 491, 492 of FIG. 20, respectively. This is to say, the inner workings of these entities may be as shown in FIG. 20 and independently, the surrounding network topology may be that of FIG. 21.

In FIG. 21, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 22:
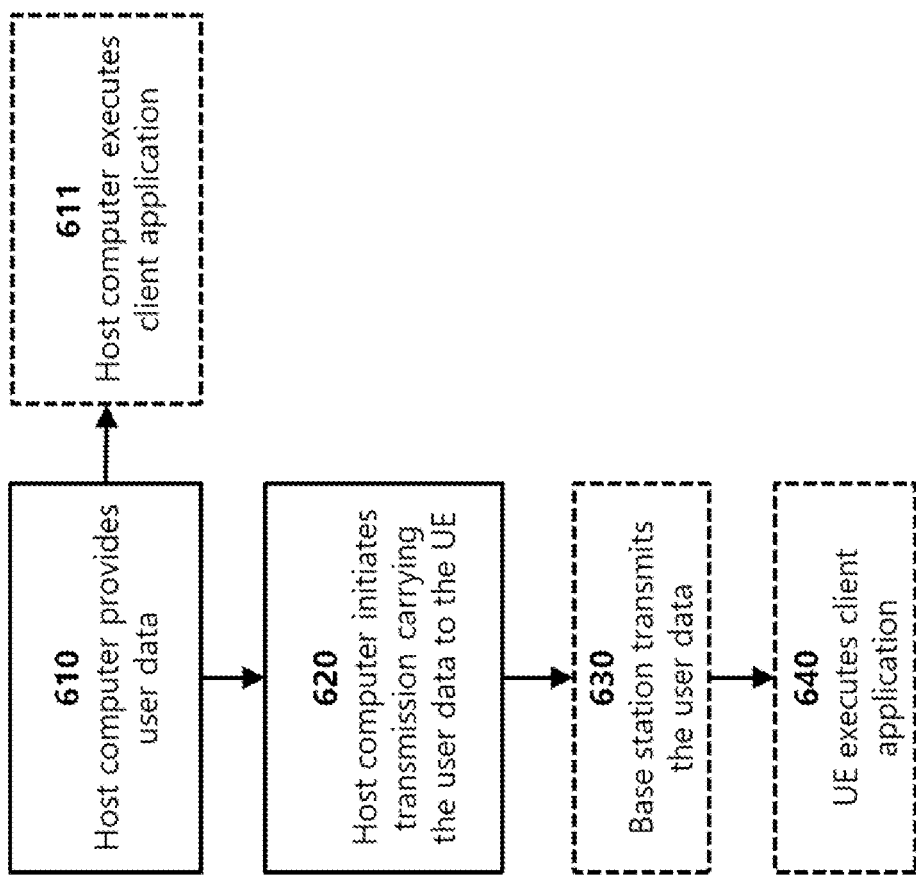
FIG. 22 is a flowchart illustrating a method implemented, according to certain embodiments.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 23:
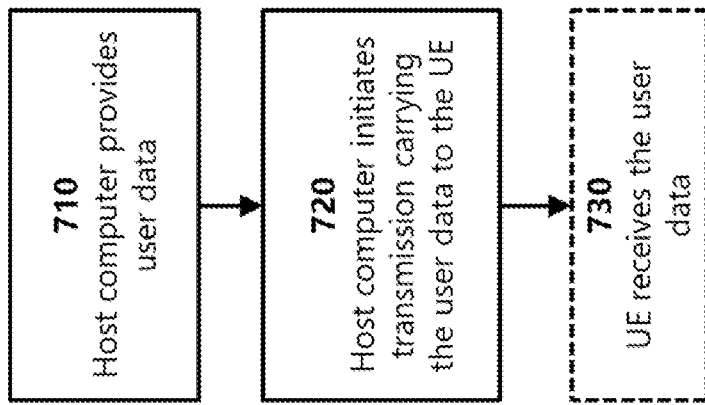
FIG. 23 is a flowchart illustrating a method implemented in a communication system, according to certain embodiments.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 24:
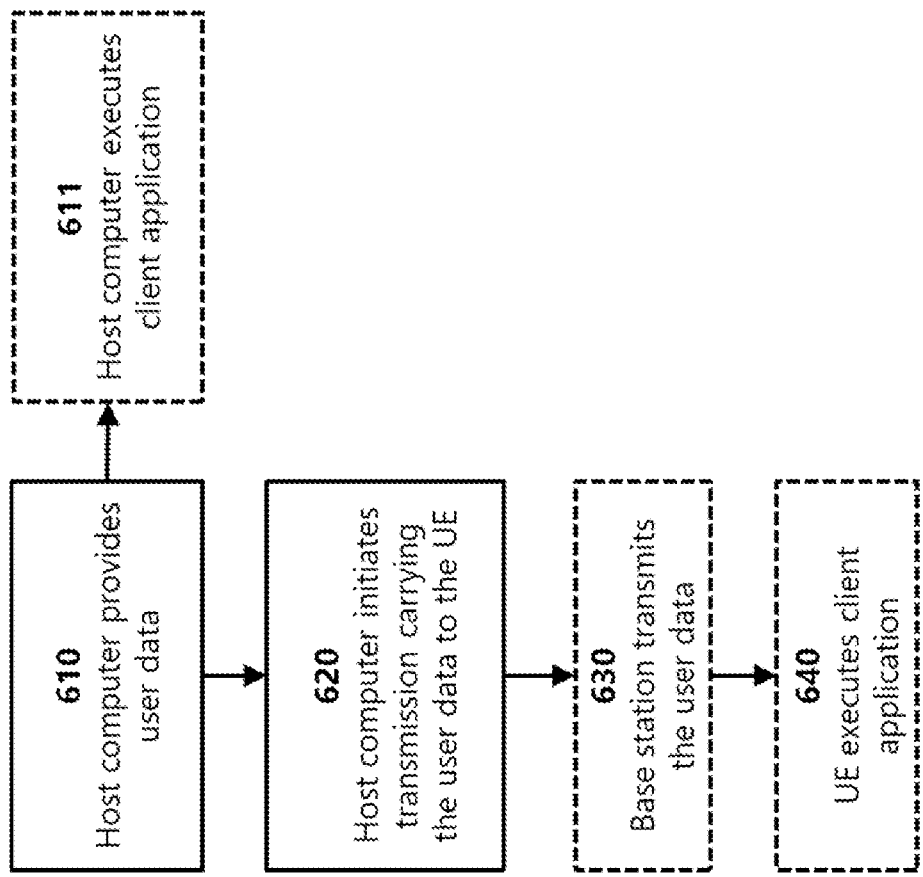
FIG. 24 is a flowchart illustrating a method implemented in a communication system, according to certain embodiments.

FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 25:
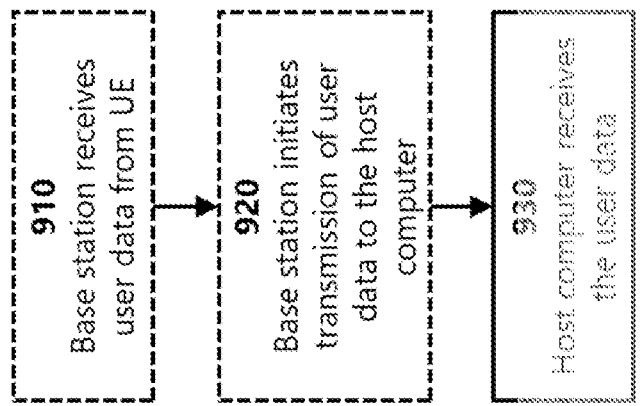
FIG. 25 is a flowchart illustrating a method implemented in a communication system, according to certain embodiments.

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a first network node in an integrated access and backhaul (IAB) network comprising an IAB donor central unit (CU) network node, IAB donor distributed unit (DU) network node, and at least one of an access IAB network node and an intermediate IAB network node, the method comprising:
   receiving a backhaul channel configuration from a second network node, the backhaul channel configuration comprising a mapping of one or more traffic identifiers to one or more wireless backhaul channels wherein the one or more traffic identifiers comprise first traffic identifiers;
   receiving incoming traffic on an ingress link for transmission on a wireless backhaul channel;
   receiving a mapping of one or more second traffic identifiers to the one or more first traffic identifiers wherein the mapping further comprises an identification of a default first traffic identifier;
   determining the wireless backhaul channel on an egress link for transmitting the incoming traffic based on a type of the incoming traffic, the mapping of one or more second traffic identifiers to the one or more first traffic identifiers and the mapping of one or more traffic identifiers to one or more wireless backhaul channels; and
   transmitting the received incoming traffic on the determined wireless backhaul channel on the egress link.

2. The method of claim 1, wherein receiving the backhaul channel configuration comprises receiving radio resource control (RRC) signaling from the second network node.

3. The method of claim 1, wherein the traffic identifier comprises a traffic type.

4. The method of claim 3, wherein the traffic type comprises one or more of F1 traffic, operations and maintenance (OAM) traffic, general packet radio service (GPRS) tunnelling protocol (GTP) traffic, and a fifth generation (5G) quality of service (QOS) indicator (5QI).

5. The method of claim 1, wherein the traffic identifier comprises a general packet radio service (GPRS) tunnelling protocol (GTP) tunnel endpoint identifier (TEID).

6. The method of claim 1, wherein the one or more first identifiers comprise one of an Internet protocol (IP) differentiated services code point (DSCP) and an IP flow label.

7. The method of claim 1, wherein the second traffic identifier comprises a traffic type.

8. The method of claim 7, wherein the traffic type comprises one or more of F1 traffic, operations and maintenance (OAM) traffic, general packet radio service (GPRS) tunnelling protocol (GTP) traffic, and a fifth generation (5G) quality of service (QOS) indicator (5QI).

9. The method of claim 1, wherein the second traffic identifier comprises a general packet radio service (GPRS) tunnelling protocol (GTP) tunnel endpoint identifier (TEID).

10. A first network node in an integrated access and backhaul (IAB) network comprising an IAB donor central unit (CU) network node, IAB donor distributed unit (DU) network node, and at least one of an access IAB network node and an intermediate IAB network node, the first network node comprising processing circuitry operable to:
    receive a backhaul channel configuration from a second network node, the backhaul channel configuration comprising a mapping of one or more traffic identifiers to one or more wireless backhaul channels wherein the one or more traffic identifiers comprise first traffic identifiers;
    receive incoming traffic on an ingress link for transmission on a wireless backhaul channel;
    receive a mapping of one or more second traffic identifiers to the one or more first traffic identifiers wherein the mapping further comprises an identification of a default first traffic identifier;
    determine the wireless backhaul channel on an egress link for transmitting the incoming traffic based on a type of the incoming traffic, the mapping of one or more second traffic identifiers to the one or more first traffic identifiers and the mapping of one or more traffic identifiers to one or more wireless backhaul channels; and
    transmit the received incoming traffic on the determined wireless backhaul channel on the egress link.

11. The network node of claim 10, wherein the processing circuitry is operable to receive the backhaul channel configuration by receiving radio resource control (RRC) signaling from the second network node.

12. The network node of claim 10, wherein the traffic identifier comprises a traffic type.

13. The network node of claim 12, wherein the traffic type comprises one or more of F1 traffic, operations and maintenance (OAM) traffic, general packet radio service (GPRS) tunnelling protocol (GTP) traffic, and fifth generation (5G) quality of service (QOS) indicator (5QI).

14. The network node of claim 10, wherein the traffic identifier comprises a general packet radio service (GPRS) tunnelling protocol (GTP) tunnel endpoint identifier (TEID).

15. The network node of claim 10, wherein the one or more first identifiers comprise one of an Internet protocol (IP) differentiated services code point (DSCP) and an IP flow label.

16. The network node of claim 10, wherein the second traffic identifier comprises a traffic type.

17. The network node of claim 16, wherein the traffic type comprises one or more of F1 traffic, operations and maintenance (OAM) traffic, general packet radio service (GPRS) tunnelling protocol (GTP) traffic, and fifth generation (5G) quality of service (QOS) indicator (5QI).

18. The network node of claim 10, wherein the second traffic identifier comprises a general packet radio service (GPRS) tunnelling protocol (GTP) tunnel endpoint identifier (TEID).

* * * * *